(12) United States Patent
Zhang

(10) Patent No.: US 12,400,438 B2
(45) Date of Patent: Aug. 26, 2025

(54) VIDEO GENERATION METHOD AND APPARATUS, STORAGE MEDIUM, AND COMPUTER DEVICE

(71) Applicant: TENCENT TECHNOLOGY (SHENZHEN) COMPANY LIMITED, Shenzhen (CN)

(72) Inventor: Xinlei Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 367 days.

(21) Appl. No.: 17/983,071

(22) Filed: Nov. 8, 2022

(65) Prior Publication Data

US 2023/0066716 A1 Mar. 2, 2023

Related U.S. Application Data

(63) Continuation of application No. PCT/CN2021/098796, filed on Jun. 8, 2021.

(30) Foreign Application Priority Data

Jul. 3, 2020 (CN) .......................... 202010636852.5

(51) Int. Cl.
  *G06V 10/80* (2022.01)
  *G06T 7/70* (2017.01)
  (Continued)

(52) U.S. Cl.
  CPC .............. *G06V 10/803* (2022.01); *G06T 7/70* (2017.01); *G06V 10/16* (2022.01); *G06V 40/174* (2022.01);
  (Continued)

(58) Field of Classification Search
  CPC .... G06V 10/803; G06V 10/16; G06V 40/174; G06V 40/20; G06V 40/16; G06T 7/70;
  (Continued)

(56) References Cited

U.S. PATENT DOCUMENTS 10,021,276 B1 * 7/2018 Chang ..................... H04N 5/04
10,298,827 B2    5/2019 Wang
(Continued)

FOREIGN PATENT DOCUMENTS

CN    101076111 A    11/2007
CN    106021496 A    10/2016
(Continued)

OTHER PUBLICATIONS

The World Intellectual Property Organization (WIPO) International Search Report for PCT/CN2021/098796 Sep. 9, 2021 7 Pages (including translation).
(Continued)

*Primary Examiner* — Amandeep Saini
*Assistant Examiner* — Andrew S Budisalich
(74) *Attorney, Agent, or Firm* — ANOVA LAW GROUP PLLC

(57) ABSTRACT

A video generation method includes: performing video shooting in response to a trigger operation for a video duet option; obtaining a second video currently shot, where the second video corresponds to a video clip including a target character in a first video; and fusing the second video into video content of the first video based on one or more characters recognized in the first video, to obtain a duet video, the one or more characters including the target character.

16 Claims, 21 Drawing Sheets

(51) Int. Cl.
 *G06V 10/10* (2022.01)
 *G06V 40/16* (2022.01)
 *G06V 40/20* (2022.01)

(52) U.S. Cl.
 CPC .... *G06V 40/20* (2022.01); *G06T 2207/20044* (2013.01); *G06T 2207/30201* (2013.01)

(58) Field of Classification Search
 CPC . G06T 2207/20044; G06T 2207/30201; G06T 5/77; G06T 2200/24; G06T 2207/10016; G06T 2207/20104; G06T 5/50; G06T 7/254; H04N 5/265; H04N 5/76; H04N 23/611; H04N 23/64; H04N 23/632; H04N 23/633
 See application file for complete search history.

(56) References Cited

U.S. PATENT DOCUMENTS

| | | | |
|---|---|---|---|
| 2010/0027961 A1 | 2/2010 | Gentile et al. | |
| 2014/0169766 A1* | 6/2014 | Yu | G11B 27/34 386/282 |
| 2015/0179219 A1* | 6/2015 | Gao | G06V 10/24 386/278 |
| 2015/0363670 A1* | 12/2015 | Sugishita | G06V 20/52 382/218 |
| 2016/0055651 A1* | 2/2016 | Oami | G06V 20/52 348/143 |
| 2020/0117952 A1* | 4/2020 | Carroll | G06V 20/52 |
| 2020/0175510 A1* | 6/2020 | Fang | G06V 20/52 |
| 2020/0252541 A1* | 8/2020 | Song | H04N 23/64 |
| 2020/0327161 A1* | 10/2020 | Liao | H04N 21/8106 |
| 2021/0027779 A1* | 1/2021 | Kurasawa | G06V 40/10 |
| 2022/0051000 A1* | 2/2022 | Zhou | G06V 40/172 |
| 2022/0148624 A1* | 5/2022 | Gao | H04N 21/47217 |

FOREIGN PATENT DOCUMENTS

| | | | | |
|---|---|---|---|---|
| CN | 106067960 A | | 11/2016 | |
| CN | 106686306 A | | 5/2017 | |
| CN | 108769549 A | * | 11/2018 | ......... H04N 5/23216 |
| CN | 108833818 A | | 11/2018 | |
| CN | 108989691 A | | 12/2018 | |
| CN | 109005352 A | | 12/2018 | |
| CN | 109040770 A | * | 12/2018 | |
| CN | 109274913 A | * | 1/2019 | |
| CN | 109922373 A | * | 6/2019 | |
| CN | 109982130 A | * | 7/2019 | |
| CN | 110121094 A | | 8/2019 | |
| CN | 110264396 A | | 9/2019 | |
| CN | 110264668 A | | 9/2019 | |
| CN | 110290425 A | | 9/2019 | |
| CN | 110505513 A | | 11/2019 | |
| CN | 110536075 A | | 12/2019 | |
| CN | 110855893 A | | 2/2020 | |
| CN | 110913244 A | | 3/2020 | |
| CN | 111726536 A | | 9/2020 | |
| JP | 2012108923 A | | 6/2012 | |
| WO | 2017063133 A1 | | 4/2017 | |

OTHER PUBLICATIONS

"Video co-production", https://help.aliyun.com/document_detail/123593.html.
Guo Shaobei, "Getting started with DeepFake", https://www.jianshu.com/p/fdaf464f7f0e.
Sen Qiao et al., "Real-Time Human Gesture Grading Based on OpenPose", 2017 10th International Congress on Image and Signal Processing, BioMedical Engineering and Informatics.
"Implementation of Moving Object Detection and Tracking Algorithms". https://wenku.baidu.com/view/3809d20c4a7302768e9939fa.html ?_wkts_=1667942611524.
China National Intellectual Property Administration (CNIPA) Office Action 1 for 202010636852.5 Jul. 21, 2023 14 Pages (including translation).

* cited by examiner

VIDEO GENERATION METHOD AND APPARATUS, STORAGE MEDIUM, AND COMPUTER DEVICE

CROSS-REFERENCES TO RELATED APPLICATIONS

This application is a continuation application of PCT Patent Application No. PCT/CN2021/098796, entitled "VIDEO GENERATION METHOD AND APPARATUS, STORAGE MEDIUM AND COMPUTER DEVICE" and filed on Jun. 8, 2021, which claims priority to Chinese Patent Application No. 2020106368525, entitled "VIDEO GENERATION METHOD AND APPARATUS, STORAGE MEDIUM, AND COMPUTER DEVICE" and filed with the National Intellectual Property Administration, PRC on Jul. 3, 2020, the entire contents of both of which are incorporated herein by reference.

FIELD OF THE TECHNOLOGY

The present disclosure relates to the field of video processing technologies, and in particular, to video generation technologies.

BACKGROUND OF THE APPLICATION

With the rapid development of material civilization, people have increasingly higher pursuit of spiritual civilization, and various video sharing platforms have emerged on the market, for example, the short video sharing platform. Currently, the original photographer can post a video to the video sharing platform after shoot or video production. Another user can not only watch the video through the video sharing platform, but also perform operations such as liking, commenting, or forwarding on the video.

In addition, in consideration of adding fun and increasing video output, the video sharing platform also supports the user to re-create the video shot by another user. For example, after browsing a favorite video on the video sharing platform, the user may produce a duet video based on the favorite video, that is, the user may fuse a video shot by the user into the favorite video shot by another user to obtain the duet video. During shooting of the duet video, the shooting effect and shooting costs have always been the concerns of the users. Accordingly, how to achieve a high-quality shooting effect in a video duet scenario and reduce shooting costs becomes an urgent problem to be resolved by a person skilled in the art.

SUMMARY

Embodiments of the present disclosure provide a video generation method and apparatus, a storage medium, and a computer device, which can not only achieve a high-quality shooting effect, but also reduce shooting costs. The technical solutions are as follows:

According to an aspect, a video generation method is provided, performed by an electronic device, the method including: performing video shooting in response to a trigger operation for a video duet option; obtaining a second video currently shot, where the second video corresponds to a video clip including a target character in a first video; and fusing the second video into video content of the first video based on one or more characters recognized in the first video, to obtain a duet video, the one or more characters including the target character.

According to another aspect, a video generation apparatus is provided, including: a first processing module, configured to perform video shooting in response to a trigger operation for a video duet option; a video obtaining module, configured to obtain a second video currently shot, the second video corresponding to a video clip including a target character in a first video; and a second processing module, configured to fuse the second video into video content of the first video based on one or more characters recognized in the first video, to obtain a duet video.

According to another aspect, an electronic device is provided, including a processor and a memory, the memory storing at least one piece of program code, the at least one piece of program code being loaded and executed by the processor to implement: performing video shooting in response to a trigger operation for a video duet option; obtaining a second video currently shot, where the second video corresponds to a video clip including a target character in a first video; and fusing the second video into video content of the first video based on one or more characters recognized in the first video, to obtain a duet video, the one or more characters including the target character.

According to another aspect, a non-transitory storage medium is provided, storing at least one piece of program code, the at least one piece of program code being loaded and executed by a processor to implement the foregoing video generation method.

DESCRIPTION OF EMBODIMENTS

An implementation environment involved in a video generation method provided in embodiments of the present disclosure is first described below.

Figure 1:
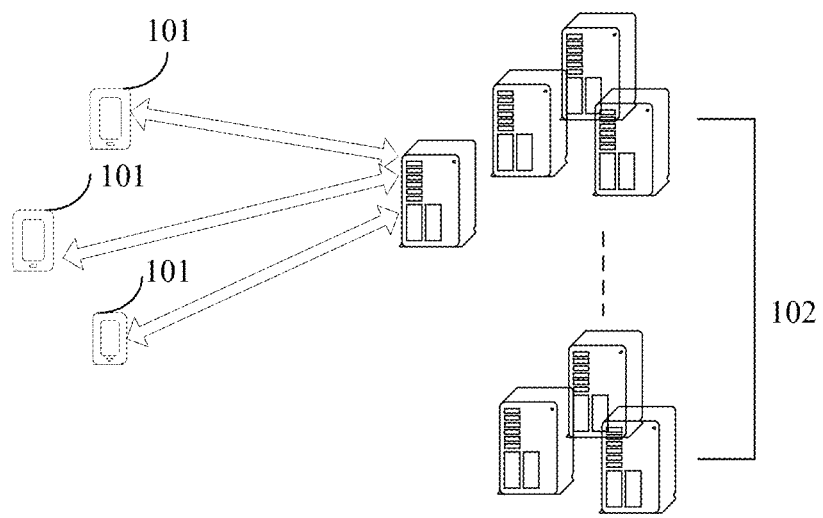
FIG. 1 is a schematic diagram of an implementation environment involved in a video generation method according to an embodiment of the present disclosure.

In Example 1, referring to FIG. 1, the implementation environment may include a terminal 101 and a server 102. That is, the video generation method provided in the embodiments of the present disclosure is jointly performed by the terminal 101 and the server 102.

The terminal 101 is usually a mobile terminal. In one embodiment, the terminal 101 includes but is not limited to a smartphone, a tablet computer, a notebook computer, a desktop computer, or the like.

The server 102 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal and the server may be directly or indirectly connected in a wired or wireless communication manner. This is not limited in this embodiment of the present disclosure.

As an example, a video client is usually installed on the terminal 101, and the server 102 is configured to provide background services for the video client, to support a user to browse a video posed by another user on a video sharing platform through the video client.

In Example 2, the implementation environment may only include the terminal 101. That is, the video generation method provided in the embodiments of the present disclosure may alternatively be performed by the terminal 101 separately. In view of this, a powerful computing processing capability is usually required for the terminal 101.

Based on the foregoing implementation environment, the video generation method provided in the embodiments of the present disclosure may be applied to a video duet scenario.

Scenario 1: A Video Duet Scenario for a Short Video

The short video generally refers to a video having a relatively short playback duration, for example, less than a specific duration threshold. For example, the duration threshold may be 30 s, or 50 s, or 60 s. This is not specifically limited in this embodiment of the present disclosure.

According to an aspect, during video duet, in this embodiment of the present disclosure, a prompt message may be outputted based on existing video picture content to provide shooting guidance for the user, so that an interesting video with high fusion degree with the original video picture may be shot by the user according to story content recorded in the original video at low costs.

In other words, in this embodiment of the present disclosure, shooting guidance (for example, a facial orientation, a facial expression, and a body movement of a character, a camera shooting mode, a character dialog, and the like) may be provided for the user based on understanding and analysis for the video picture content (for example, analyzing a camera shooting mode and a human body pose of the character, recognizing a character dialog, and the like). In this way, during video duet, the user may shoot according to a prompt message outputted by a system. In other words, in this embodiment of the present disclosure, during the video duet, guidance may be provided for user's movement pose and facial expression state, the camera shooting mode, and the like, to help the user better complete video shooting, reduce shooting costs of video duet, improving shooting efficiency and shooting effect, so that a final duet video may have a higher degree of content restoration.

For example, the camera shooting mode includes but is not limited to a camera framing mode or a camera motion mode. In some embodiments, the camera framing mode includes but is not limited to a horizontal framing mode or a vertical framing mode. In some embodiments, the camera motion mode includes but is not limited to: pushing a lens, pulling a lens, shaking a lens, following a lens, keeping a lens still, moving a lens upward, downward, leftward, and rightward, or the like.

According to another aspect, an embodiment of the present disclosure provides a short video duet mode based on scenario fusion. For example, the scenario fusion means that the original video and the video shot by the user are associated with each other in terms of content, and the final duet video is obtained by fusing content of the original video and content of the video shot by the user. In other words, video synthesis processing is to intersperse the video shot by the user into the original video and replace some video clips in the original video, to obtain finally one video, that is, the original video and the video shot by the user are synthesized into one video to obtain the duet video. Each frame of video image in the duet video includes one video picture. In other words, during presentation of the duet video, only one video is included in a picture instead of two videos on the same picture, that is, in the short video duet mode based on scenario fusion, two videos are not stiffly stitched, and two videos are not presented in the same picture in a left and right split-screen, an upper and lower split-screen, or a picture-in-picture-mode.

Scenario 2: A Video Duet Scenario for Other Short Videos

In addition to the short-video duet scenario shown in the scenario 1, the video generation method provided in the embodiments of the present disclosure may further be applied to a duet scenario for other videos, for example, movie clips or TV play clips, and this is not specifically limited in the embodiments of the present disclosure.

Figure 2:
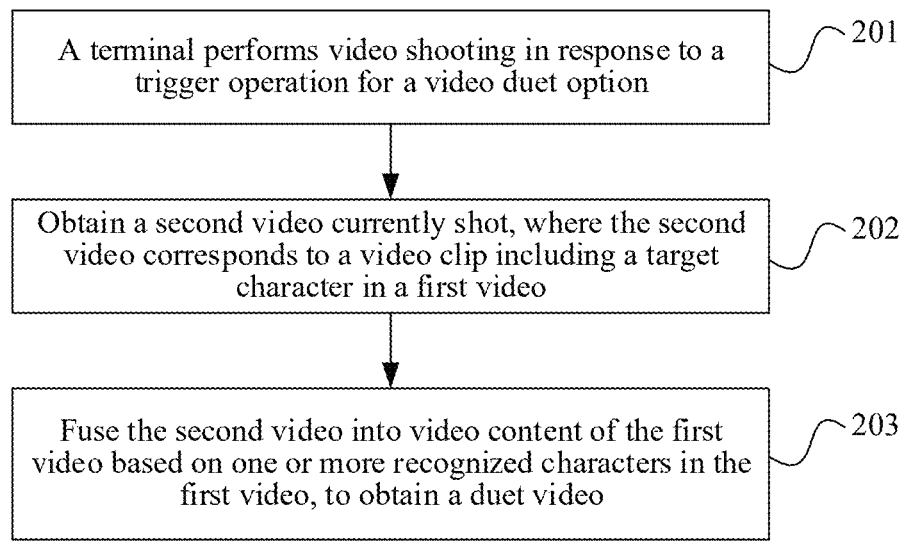
FIG. 2 is a flowchart of a video generation method according to an embodiment of the present disclosure.

FIG. 2 is a flowchart of a video generation method according to an embodiment of the present disclosure. An execution entity is, for example, the terminal 101 shown in FIG. 1. It may be understood that, in actual application, the video generation method provided in this embodiment of the present disclosure may further be performed by another electronic device with a video processing capability. Referring to FIG. 2, the method provided in this embodiment of the present disclosure includes:

201: A terminal performs video shooting in response to a trigger operation for a video duet option.

In some embodiments, the terminal may display the video duet option on a playback interface of a first video. The first video is also referred to as an original video in this embodiment of the present disclosure. That is, in this specification, a video browsed and played by the user is referred to as the first video. For example, the first video may be a short video posted on the video sharing platform by a registered user of the video sharing platform. The short video may be a user original video, or may be a user imitation video, or may be a part of video captured from any type of video such as a TV play or a movie. This is not specifically limited in this embodiment of the present disclosure. In addition, in addition to the short video, the first video may alternatively be a video in another form with a longer duration than the short video. This is also not specifically limited in this embodiment of the present disclosure. Generally, any form of video including a character role is applicable to the method.

Figure 3:
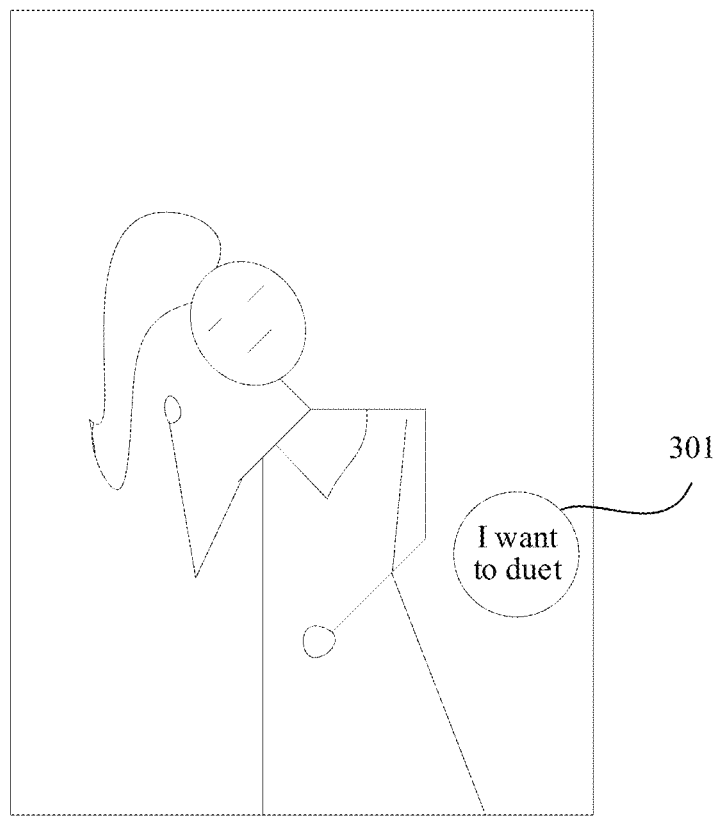
FIG. 3 is a schematic diagram of a user interface according to an embodiment of the present disclosure.

As shown in FIG. 3, during playback of the first video, one video duet option 301 may be displayed on the playback interface. As an example, to prevent the video duet option 301 from excessively blocking the presented video picture, the video duet option 301 may be arranged and displayed on an edge of the playback interface, such as a left edge, a right edge, an upper edge, or a lower edge of the playback interface. In FIG. 3, the video duet option 301 is displayed at a position on the right edge near the bottom of the playback interface. Certainly, in actual application, the video duet option 301 may further be displayed at another position, for example, another position on the playback interface other than the edges, or a position in a display column of a video operation option corresponding to the playback interface. The display position of the video duet option 301 is not limited in the present disclosure.

During playback of the first video on the terminal, when the video duet option 301 such as "I want to duet" is displayed on the playback interface, it indicates that the user may duet with the first video currently played.

For example, the trigger operation for the video duet option may be a click/tap operation performed on the video duet option 301 shown in FIG. 3 by the user. This is not specifically limited in this embodiment of the present disclosure.

202: Obtain a second video currently shot, where the second video corresponds to a video clip including a target character in the first video.

Relative to the original video, the second video currently shot through the terminal is also referred to as a user shot video herein. Generally, the second video shot by the user may correspond to the video clip including the target character in the first video. The target character may be a to-be-played character selected by the user before the second video is shot, and the target character may be any character in the first video.

In some embodiments, the terminal may further obtain a prompt message based on recognition of picture content of the first video; and display the prompt message on a shooting interface during the video shooting of the second video. The prompt message is used for instructing the shooting of the second video, that is, providing instructions for the user to shoot the second video.

The prompt message is obtained by performing picture content analysis on the first video. The analysis may be performed by the terminal or may be performed by the server. In one embodiment, the prompt message includes one or more of a camera shooting mode, a human body pose, or a character dialog. In some embodiments, the camera shooting mode is displayed to inform the user how to truly restore the shooting process of the first video, to ensure that the shot second video is highly consistent with the original first video. The human body pose may include one or more of a facial expression, a facial orientation, or a body movement. The character dialog generally refers to lines of the character.

As an example, when displaying the prompt message, the terminal may select a guidance mode combining an icon and text, to better guide the user to shoot. That is, the displaying, by the terminal, the prompt message on the shooting interface may include one or more of the following:

The terminal displays a prompt icon and prompt text of the camera shooting mode on the shooting interface.

The terminal displays a prompt icon and prompt text of the human body pose on the shooting interface.

The terminal displays the character dialog on the shooting interface.

Certainly, in actual application, the terminal may also display only one of the prompt icon or the prompt text, that is, the terminal may display the prompt icon or the prompt text of the camera shooting mode on the shooting interface, or the terminal may also display the prompt icon or the prompt text of the human body pose on the shooting interface. The content of the prompt message displayed on the terminal is not limited in the present disclosure.

203: Fuse the second video into video content of the first video based on one or more characters recognized in the first video, to obtain a duet video.

The duet video may be obtained by performing synthesis processing on the original video and the user shot video based on the recognition of the target character and another character in the original video, and the duet video may finally present a video duet effect for the user. In addition to being performing by the terminal, synthesis processing may alternatively be performed by the server. This is not specifically limited in this embodiment of the present disclosure.

As an example, the fusing the second video into video content of the first video to obtain a duet video includes but is not limited to: replacing the video clip including the target character in the first video with the second video when the first video does not include a same-frame picture of the selected target character and another character, where in other words, in such a manner, a video frame including the target character in the first video is replaced with a video frame included in the second video; or replacing a facial image of the target character in the same-frame picture with a user facial image in the second video when the first video includes a same-frame picture that includes the target character and at least one other character of the one or more recognized characters, where in other words, in such a manner, face swapping is performed on the target character in the same-frame picture, and the facial image of the target character in the same-frame picture is replaced with the user facial image in the second video. In some embodiments, during playback, the duet video may present the following effects: the video pictures in the first video and the second video are played in a linearly interspersed manner.

The same-frame picture refers to a video picture simultaneously including the target character and another character, for example, assuming that the first video includes a character A, a character B, and a character C, and the user selects the character A as the target character before shooting the second video, a picture simultaneously including the character A and the character B, a picture simultaneously including the character A and the character C, and a picture simultaneously including the character A, the character B, and the character C in the first video all belong to the same-frame picture.

In the method provided in this embodiment of the present disclosure, the terminal may display one video duet option; the terminal may perform video shooting in response to a trigger operation performed on the video duet option by the user, to obtain a second video, where the second video corresponds to a video clip including a target character in the first video; and the terminal may fuse the second video into video content of the first video based on one or more characters recognized in the first video, to obtain a duet video. That is, the duet video is obtained by fusing content of the first video and the second video, so that the duet video may have good content fit, and the user can be deeply involved in video production, thereby improving the personalization degree of the video. The video generation method can not only achieve a high-quality video production effect, but also significantly reduce shooting costs.

Figure 4:
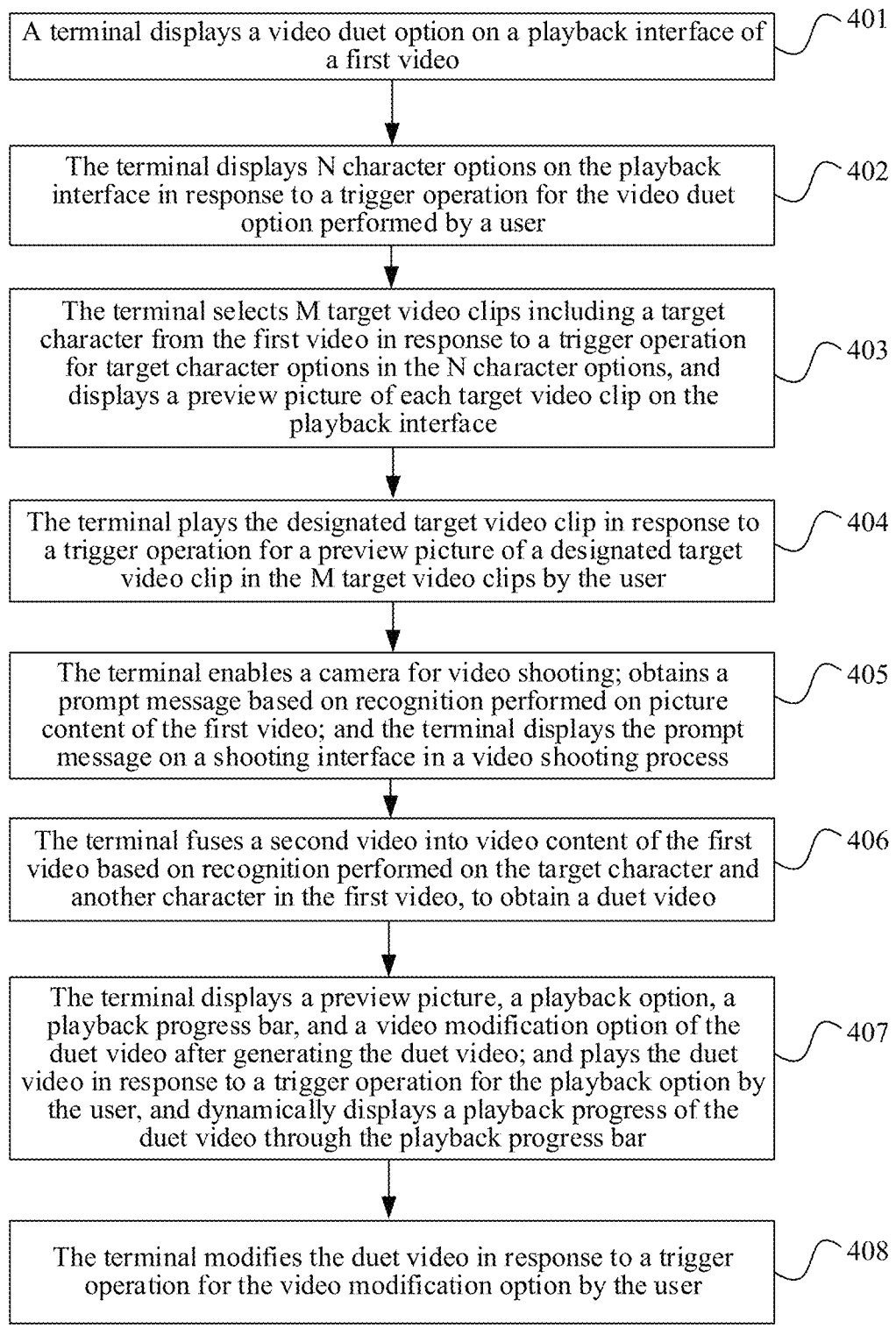
FIG. 4 is a flowchart of a video generation method according to an embodiment of the present disclosure.

FIG. 4 is a flowchart of a video generation method according to an embodiment of the present disclosure. An execution entity of the method may be, for example, the terminal 101 shown in FIG. 1. The first video includes N characters, N being a positive integer and N≥2. That is, a precondition for the video duet mode provided in this embodiment of the present disclosure is that the original video includes at least two characters. Referring to FIG. 4, a method process provided in this embodiment of the present disclosure includes:

401: A terminal displays a video duet option on a playback interface of a first video.

This step is similar to step S201, and details are not described herein again.

402: The terminal displays N character options on the playback interface in response to a trigger operation for the video duet option performed by the user.

In this embodiment of the present disclosure, after the user performs the trigger operation on the video duet option, the terminal confirms that the user enables a video duet function, and the trigger operation may further activate the terminal to perform the step of face recognition in the first video. For example, face recognition may be performed by using a face recognition algorithm based on a convolution neural network. The terminal obtains a quantity of characters and character IDs included in the first video by performing face recognition in the first video. The quantity of characters is consistent with a quantity of character options.

Figure 5:
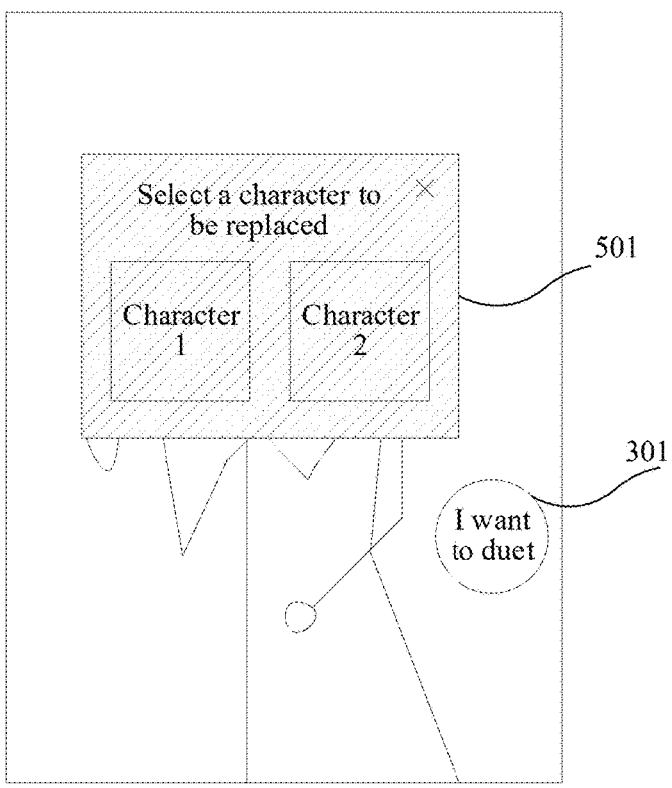
FIG. 5 is a schematic diagram of another user interface according to an embodiment of the present disclosure.

FIG. 5 shows N character options 501. It can be seen from the N character options 501 shown in FIG. 5 that, the first video selected by the user for duet includes two characters, namely a character 1 and a character 2. The user may select any one of the two characters to shoot in a replacement manner. For example, after the user taps the video duet option, the terminal may pop up a window to prompt that there are two characters can be shot in the video, and the user may select one of the characters for replacement, that is, the user performs picture content of the selected character.

As an example, character options of the character 1 and the character 2 shown in FIG. 5 may respectively be presented by corresponding character pictures. The character pictures may be a frame of video picture of the character 1 in the first video or a frame of video image of the character 2 in the first video. This is not specifically limited in this embodiment of the present disclosure.

403: The terminal selects M target video clips including the target character from the first video in response to a trigger operation for target character options in the N character options, and displays a preview picture of each target video clip on the playback interface.

M is a positive integer and M≥1. The trigger operation for the target character option may be a tap operation on any one of the N character options performed by the user, and a character corresponding to the character option selected by the user is referred to as the target character herein. In this embodiment of the present disclosure, when the user selects one of the characters shown in FIG. 5 (for example, selecting the character 1), the terminal or the server may select M video clips including the character 1 from the first video as target video clips, and the terminal may display a preview picture of each target video clip in the M target video clips on the playback interface, so that the user may watch the target video clips at will.

Figure 6:
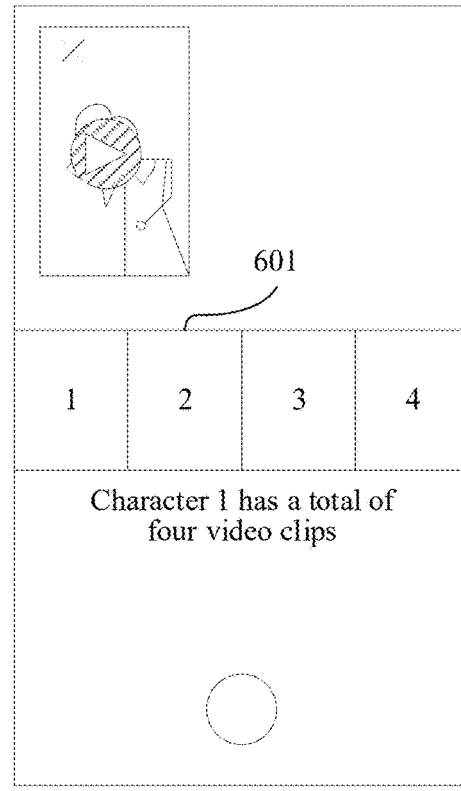
FIG. 6 is a schematic diagram of another user interface according to an embodiment of the present disclosure.

FIG. 6 shows preview pictures 601 of four target video clips related to the character 1. For example, the preview pictures 601 of the four target video clips may be presented on the playback interface in a tiled manner or in a list manner, and the preview pictures 601 of the four target video clips may be a first frame, a key frame, or a randomly selected video frame of the each target video clip. This is not specifically limited in this embodiment of the present disclosure.

404: The terminal plays the designated target video clip in response to a trigger operation for a preview picture of a designated target video clip in the M target video clips by the user.

When there is a relatively large quantity of target video clips related to the target character in the first video, in this embodiment of the present disclosure, the preview picture of the each target video clip may further be slidably displayed in response to a slide operation for the preview picture of the each target video clip performed by the user. As an example, the trigger operation for the preview picture of the designated target video clip may be a tap operation on the preview picture of the designated target video clip performed by the user.

405: The terminal enables a camera for video shooting; obtains a prompt message based on recognition of picture content of the first video; and the terminal displays the prompt message on a shooting interface during the video shooting of the second video.

The prompt message is used for guiding the user to shoot a second video.

In this embodiment of the present disclosure, after enabling the camera for video shooting, the terminal presents, according to the sequence of the M target video clips, target video clips to be imitated and performed by the user on the shooting interface one by one, and analyzes and obtains core information in the video picture, to obtain a prompt message adapted to a current shooting progress. That is, in the video shooting process, the displaying the prompt message on the shooting interface includes but is not limited to: performing picture content analysis on the each target video clip related to the target character, to obtain one or more prompt messages corresponding to the one or more target video clips; or displaying the one or more prompt messages corresponding to the one or more target video clips on the shooting interface in a process of shooting the second video according to the one or more target video clips.

In one embodiment, the displaying the one or more prompt messages corresponding to the one or more target video clips on the shooting interface includes but is not limited to displaying a video window on a top level of the shooting interface in a floating manner. The video window is used for displaying target video clips matching a current shooting progress, that is, target video clips corresponding to the prompt message current displayed. The top-level display manner means that the video window is displayed on the top of a page without being blocked by any other layers.

As shown in FIG. 7 to FIG. 10, in the video shooting process, the terminal may select to display the target video clips to be imitated and performed by the user in an upper left corner of the shooting interface, to prompt the user without excessively occupying the shooting interface. In addition to the upper left corner, the video clips to be imitated and performed by the user may be selected to be displayed at a position such as an upper right corner, a lower left corner, or a lower right corner of the shooting interface. Alternatively, the terminal may also display the video window at a corresponding position on the shooting interface in response to a drag operation for the video window performed by the user. This is not specifically limited in this embodiment of the present disclosure.

In this embodiment of the present disclosure, FIG. 7 to FIG. 10 further show different types of prompt messages 701 displayed on the shooting interface.

Figure 7:
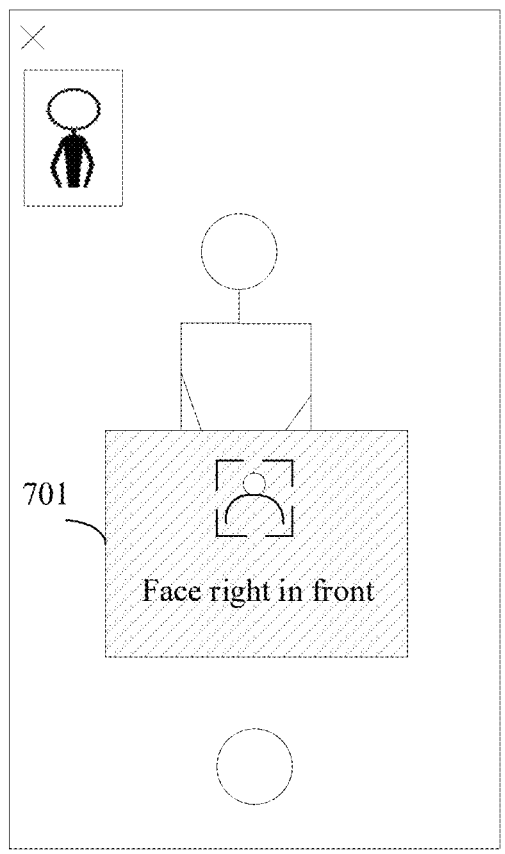
FIG. 7 is a schematic diagram of another user interface according to an embodiment of the present disclosure.

According to FIG. 7, after performing picture content analysis on the first video and learning about that the user needs to shoot facing right in front at this time, the terminal may correspondingly provide a prompt on the shooting interface, to guide the user to shoot, so that the video picture shot by the user has a higher degree of matching with the characters and a picture logic in the original video. As shown in FIG. 7, the prompt message 701 presented on the shooting interface at this time includes: a prompt icon of a facial orientation and prompt text "face right in front"

Figure 8:
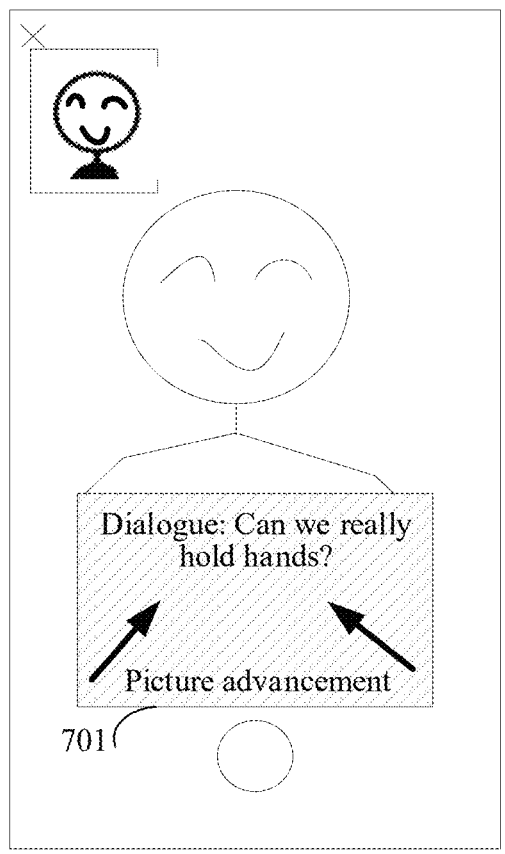
FIG. 8 is a schematic diagram of another user interface according to an embodiment of the present disclosure.

According to FIG. 8, to ensure that the user can truly restore the shooting process to ensure that the shot second video is highly consistent with the original first video, the prompt message 701 may further include a camera shooting mode. As shown in FIG. 8, it can be seen from picture content analysis performed on the original video that, a picture of pushing a lens is currently shown, and the terminal may present a prompt icon (as shown by arrows in FIG. 8) and prompt text (picture advancing) of the camera shooting mode shown in FIG. 8 on a user interface (UI), to inform the user how to control a lens. In addition, the terminal may further present a character dialog matching the current shooting progress on the UI, to inform the user of text content to be read out during shooting. FIG. 8 shows that the user needs to read out the character dialog "Can we really hold hands?" while advancing the picture.

Figures 9, 10:
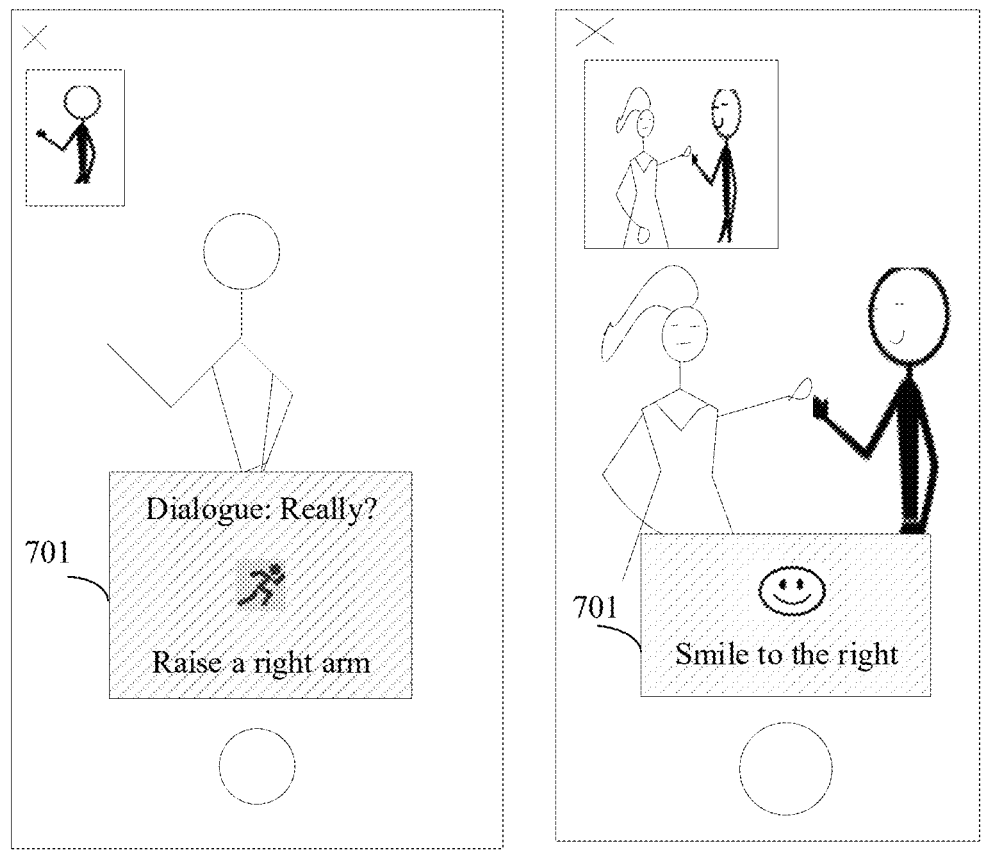
FIG. 9 is a schematic diagram of another user interface according to an embodiment of the present disclosure.
FIG. 10 is a schematic diagram of another user interface according to an embodiment of the present disclosure.

According to FIG. 9, the prompt message 701 may further include a body movement. For example, it can be seen from picture content analysis performed on the original video that, a right arm of a current character is raised, and the terminal may also synchronously perform UI presentation of the body movement on the shooting interface, that is, presenting a prompt icon and prompt text of the body movement on the shooting interface. As shown in FIG. 9, the prompt icon may be "Little Man in Motion", and the prompt text may be "Raise a right arm". In addition, the user further needs to read out a character dialog "Really?" while performing the body movement.

According to FIG. 10, the prompt message 701 may further include a facial expression. That is, a prompt icon and prompt text of the facial expression may further be presented on the shooting interface. For example, it can be seen from picture content analysis performed on the original video that, a current character smile to the right, and the terminal may also synchronously perform UI presentation of the facial expression on the shooting interface, that is, presenting a prompt icon and prompt text of the facial expression on the shooting interface. As shown in FIG. 10, the prompt icon may be "a smiling face" and the prompt text may be "smiling to the right".

In another embodiment, during video shooting, the user may also be prompted by countdown before each target video clip is shot, to facilitate the user to be familiar with the character dialog and movement to be performed and prevent the user from missing first one or two seconds of each target video clip (M target video clips to be imitated). For example, countdown of 10 s or 5 s or 3 s may be started before shooting is performed. In some embodiments, a countdown prompt may be in a form of voice or graphic text, and this is not specifically limited in this embodiment of the present disclosure. In some embodiments, in a process of shooting the second video according to the one or more target video clips, in addition to the foregoing countdown prompt, a trigger control may be displayed on the interface, and shooting of a current video clip is started after the user is detected to actively trigger the control. In some embodiments, the user may also trigger the current shooting through voice. That is, the terminal has a voice recognition function, the shooting of the current video clip is automatically started after voice sent by the user is recognized as a shooting start command.

406: The terminal fuses the second video into video content of the first video based on one or more characters recognized in the first video, to obtain a duet video.

A short video duet mode based on scenario fusion is provided in this embodiment of the present disclosure, the terminal may capture a second video based on a prompt message displayed on the terminal, and when a first video and the currently shot second video are synthesized, the terminal usually adopts the following processing methods: synthesizing the first video and the second video into one video, to obtain a duet video. Each frame of video image in the duet video only includes one video picture.

The scenario fusion means that the original first video and the second video shot by the user are associated with each other in terms of content, and a final duet video is obtained by fusing content of the first video and content of the second video. In other words, video synthesis processing is to intersperse the second video shot by the user into the original first video, to replace some video clips in the first video, and one video is finally obtained, that is, the original first video and the second video shot by the user are synthesized into one video to obtain the duet video. Each frame of video image in the duet video includes one video picture.

In one embodiment, the terminal may directly replace the M target video clips with the second video when M target video clips associated with the target character selected by the user do not include a same-frame picture that includes the target character and at least one other character of the one or more recognized characters; or the terminal may replace a second facial image of the target character in the same-frame picture with a first facial image in the second video when M target video clips associated with the target character selected by the user include a same-frame picture that includes the target character and at least one other character of the one or more recognized characters, where the first facial image is a user facial image captured by the camera when the user imitates the target character in the same-frame picture.

Briefly, when a character to be performed by the user needs to appear together with another character in the same frame, the processing manner of the terminal in this case is to replace a person facial image in an original video with the user facial image, that is, perform face swapping, to achieve consistency between story and the picture logic.

Based on the above, during presentation of the duet video, only one video is included in a picture instead of two videos on the same picture, that is, in the video duet mode based on scenario fusion provided in the present disclosure, two videos are not stiffly stitched, and two videos are not presented in the same picture in a left and right split-screen, an upper and lower split-screen, or a picture-in-picture-mode.

407: The terminal displays a preview picture, a playback option, a playback progress bar, and a video modification option of the duet video after generating the duet video; and plays the duet video in response to a trigger operation for the playback option by the user, and dynamically displays a playback progress of the duet video through the playback progress bar.

After the duet video is synthesized by the terminal device, the user may choose to watch the final duet video and choose whether to post or modify the video.

Figure 11:
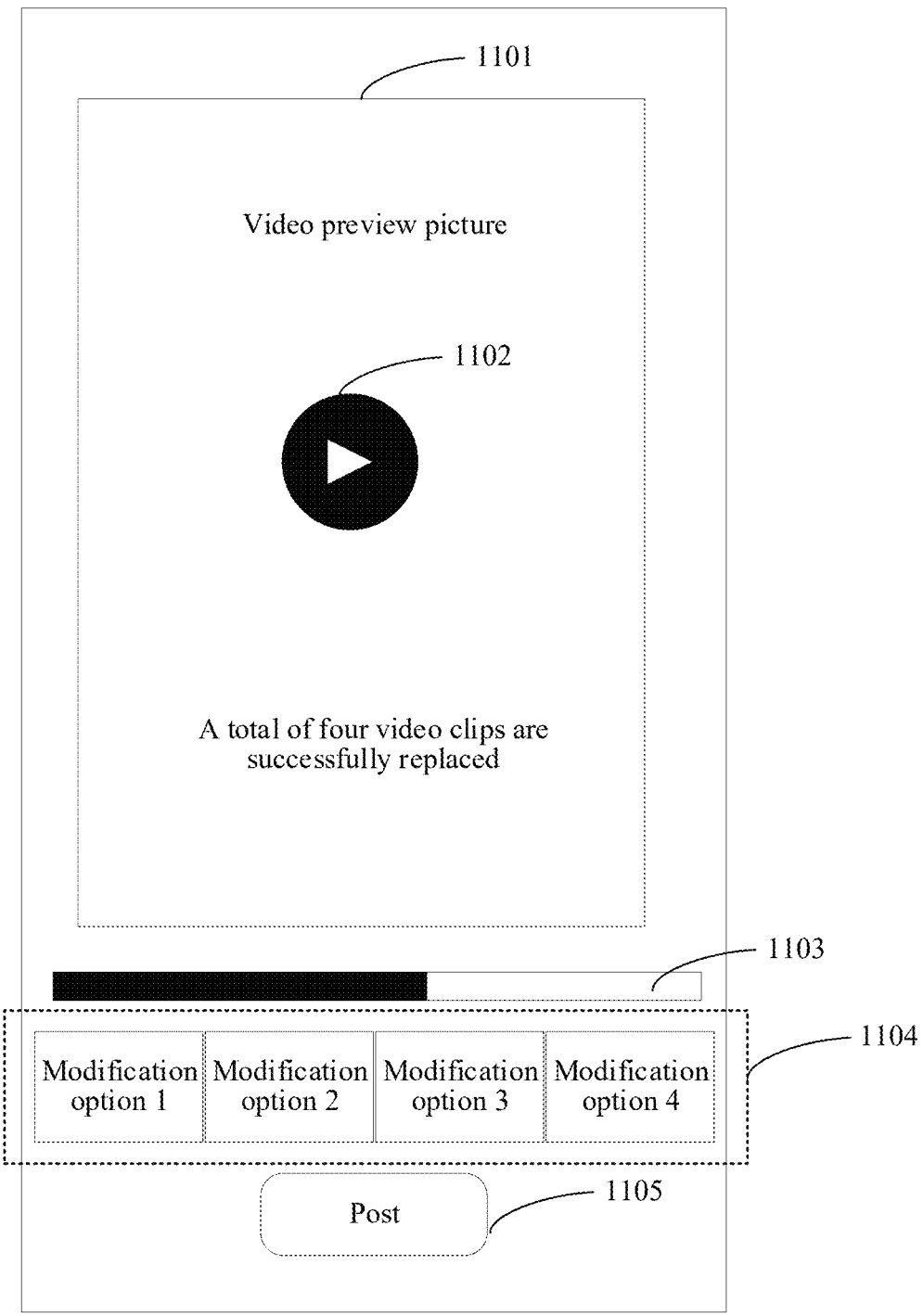
FIG. 11 is a schematic diagram of another user interface according to an embodiment of the present disclosure.

As shown in FIG. 11, after the duet video is generated, the terminal may display a preview picture 1101, a playback option 1102, a playback progress bar 1103, and a video modification option 1104 of the duet video. There may be a plurality of video modification options 1104, and merely four video modification options are exemplarily shown in FIG. 11, namely, a modification option 1, a modification option 2, a modification option 3, and a modification option 4. It may be understood that, a quantity of the video modification options may be greater than or less than four as shown in the figure. This is not specifically limited in this embodiment of the present disclosure.

In one embodiment, the preview picture 1101 of the duet video may be a first frame, a key frame, or a randomly selected video frame of the duet video. This is not specifically limited in this embodiment of the present disclosure.

For example, the trigger operation for the playback option may be a tap operation performed on the playback option 1102 by the user.

408: The terminal modifies the duet video in response to a trigger operation for the video modification option by the user.

For example, the trigger operation for the video modification option may be a tap operation performed on the video modification option 1104 by the user. In one embodiment, the video modification option 1104 may include but is not limited to: adjusting material, adding text, adding stickers, adding filters, beautifying, and the like. This is not specifically limited in this embodiment of the present disclosure.

In addition to displaying the preview picture 1101, the playback option 1102, the playback progress bar 1103, and the video modification option 1104 of the duet video, the terminal may further display a post option 1105. The user may post the generated duet video to a video sharing platform or a personal homepage by triggering the post option 1105, or other users to browse or watch.

In addition, the terminal may display an error prompt message on the shooting interface when a video picture currently shot by a camera does not match a prompt message currently displayed, that is, a relevant operation or action performed by the user does not match the prompt message currently displayed, where the error prompt message is used for guiding the user to re-shoot the video. In addition to displaying the prompt message in the form of text or icon, a prompt message in a form of voice may also be played. This is not specifically limited in this embodiment of the present disclosure.

The method provided in the embodiments of the present disclosure at least has the following beneficial effects:

The terminal may display a video duet option on a playback interface of a to-be-played video selected by the user. Then, the terminal may perform video shooting in response to a trigger operation for the video duet option by the user. The terminal may automatically display a prompt message on the shooting interface during the video shooting of the second video. That is, the prompt message may be presented on the shooting interface of the user, to guide the user to quickly complete shooting with good quality. Finally, the video currently shot is fused into content of the original video based on recognition of the target character and another character in the original video, to generate a duet video, thereby implementing video duet. The video generation method can not only achieve a high-quality video shooting effect, but also significantly reduce shooting costs. For example, such a method can reach a higher level in lens presentation and character performance, and simultaneously speed up the completion of video shooting, thereby saving time and labor costs.

That is, in the video duet scenario, in this embodiment of the present disclosure, the prompt message beneficial to the shooting of the user can be outputted by analyzing the video picture content, thereby helping the user to quickly participate in a video creation process. In other words, on the premise of analyzing the video picture content, in this embodiment of the present disclosure, the prompt message is presented to the user to guide shooting of the user. The prompt message includes various content, for example, one or more of the camera shooting mode, the human body pose, or the character dialog.

In addition, in the video duet mode based on scenario fusion, the original first video and the second video shot by the user are synthesized into one video, that is, the duet video only includes one video in terms of picture presentation, so that the original first video and the second video shot by the user are played in a linearly interspersed manner according to a chronological order, thereby ensuring seamless connection and creation effect of the video, which has a better video creation process. In other words, according to the video duet mode, based on existing video picture content, the user can participate in the video creation process in a more natural and immersive manner, and the final duet video may have a higher degree of fusion from the perspective of the user, that is, the duet video is more compatible with the original video in content presentation and character performance, thereby avoiding stiff stitching between two videos.

Figure 12:
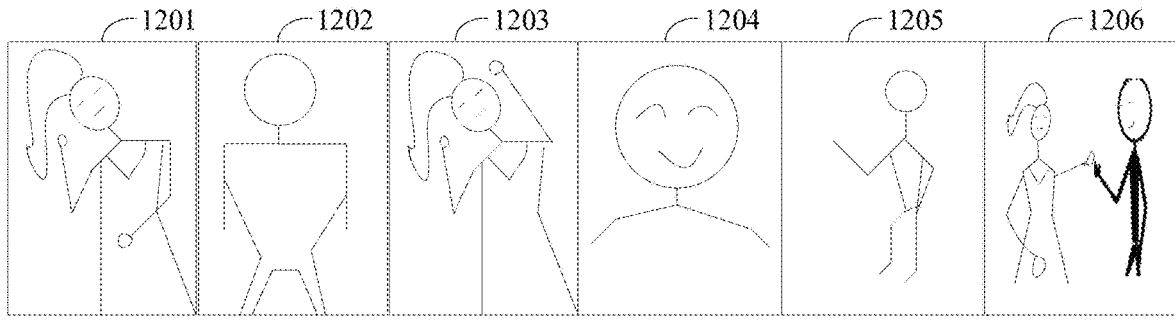
FIG. 12 is a schematic diagram of another user interface according to an embodiment of the present disclosure.

For example, that "the original first video and the second video shot by the user are played in a linearly interspersed manner according to a chronological order" is described below with reference to FIG. 12. FIG. 12 shows several video pictures captured in the duet video, and the video pictures are sorted in chronological order from left to right. In FIG. 12, a video picture 1201 and a video picture 1203 are captured from the original first video, a video picture 1202, a video picture 1204, and a video picture 1205 are captured from the second video shot by the user, and a video picture 1206 is obtained by performing face swapping on a target character included in a corresponding video picture in the first video, that is, replacing the facial image of the target character with the user facial image. During playback of the duet video, since the several video pictures shown in FIG. 12 are sequentially presented in chronological order from left to right, and the original video picture and the user shot video are played in an interspersed manner, the video duet mode achieves scenario-based fusion between the original first video and the second video shot by the user.

Figure 13:
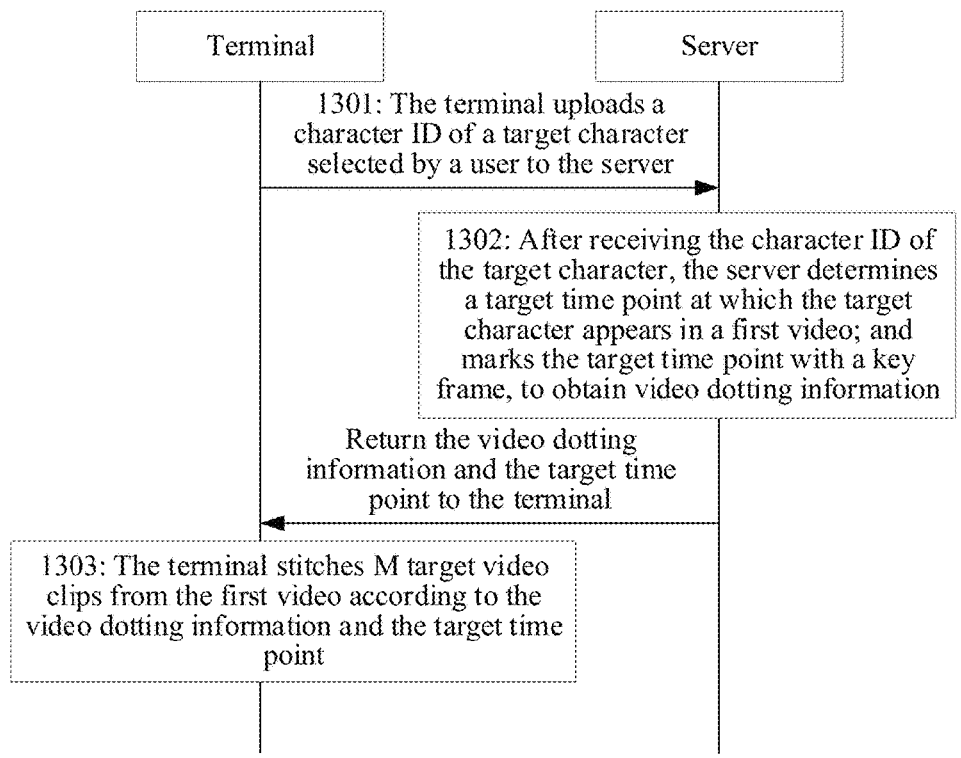
FIG. 13 is a flowchart of a video generation method according to an embodiment of the present disclosure.

In another embodiment, for "selecting M target video clips including the target character selected by the user from the first video" described in step 403, in one embodiment, the step of selecting target video clips including the target character from the first video may be performed by the server, or may be performed by the terminal. This is not specifically limited in this embodiment of the present disclosure. For a video clip selecting manner performed by the server, reference may be made to FIG. 13, including the following steps:

1301: The terminal uploads a character ID of a target character selected by a user to the server.

The character ID may be a character name, a character avatar, a character code (such as character) agreed by the terminal and the server, or the like. This is not specifically limited in this embodiment of the present disclosure.

1302: After receiving the character ID of the target character, the server determines a target time point at which the target character appears in a first video; marks the target time point with a key frame, to obtain video dotting information; and returns the video dotting information and the target time point to the terminal.

For example, the determining a target time point at which the target character appears in a first video may be implemented as follows: a video frame including a target character face is first selected from the first video, then a time point corresponding to the video frame is obtained, and the target time point at which the target character appears in the first video may be obtained.

When the target time point at which the target character appears is detected in the first video, target character face recognition may be respectively performed on each video frame included in the first video, to obtain the video frame including the target character face. In addition, to improve efficiency, target character face recognition may be performed at short intervals, that is, a face recognition algorithm may be used in a plurality of dense specified time points to determine whether there is a target character face at the specified time points, and a series of time points where there is a target character face are outputted, that is, a group of time point columns, which indicates that the target character appears at the foregoing time points of the first video. The determined time points may be sequentially sorted in chronological order. This is not specifically limited in this embodiment of the present disclosure.

In addition, after the target time point at which the target character appear is determined in the first video, the server may further dot the first video according to the target time point, to obtain video dotting information.

Briefly, video dotting refers to marking with a key frame, which means that during video playback, placing a cursor on the playback progress bar may display video content to be presented. That is, when cursor is controlled to move to a point on the playback progress bar, video content played at such a time point may be automatically displayed. The processing of video dotting marks key content points in the video, to facilitate the users to quickly browse content they want to see.

It can be seen from the foregoing description that video dotting may be key frame marking performed on the determined target time points, that is, a target time point corresponding to the key frame may be further determined from the determined target time points. The key frame usually refers to a frame where a key action or pose is located in character movement or pose change. For example, the key frame may be recognized according to a change degree between adjacent frames. This is not specifically limited in this embodiment of the present disclosure.

1303: The terminal stitches M target video clips from the first video according to the video dotting information and the target time point.

In one embodiment, stitching, by the terminal, target video clips associated with the target character in the first video includes but is not limited to the following manners: for example, during stitching of the target video clips, each stitched target video clip at least including one video dot (one key frame) may be used as a premise. In another example, a target time point between two video dots may be selected to be divided into the same target video clip, that is, the terminal may take the target time point corresponding to the key frame as the basis for dividing the video clips. In other words, target time points appearing between target time points corresponding to two key frames belong to the same target video clip. This is not specifically limited in this embodiment of the present disclosure.

Figure 14:
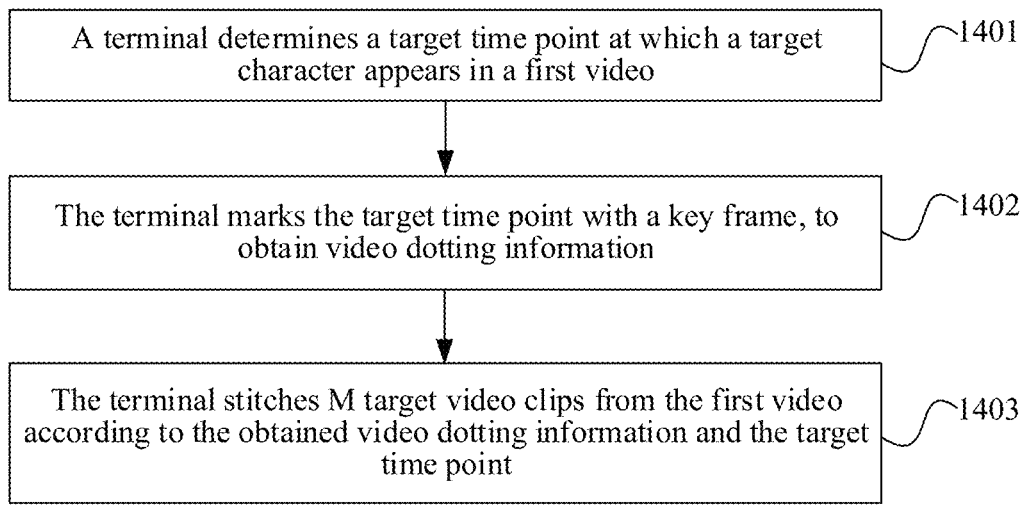
FIG. 14 is a flowchart of a video generation method according to an embodiment of the present disclosure.

In addition, referring to FIG. 14, a target video clip selecting manner performed by the terminal includes the following steps:

1401: The terminal determines a target time point at which the target character appears in a first video.

1402: The terminal marks the target time point with a key frame, to obtain video dotting information.

1403: The terminal stitches M target video clips from the first video according to the obtained video dotting information and the target time point.

For implementation of step 1401 to step 1403, reference may be made to step 1301 to step 1303.

Figure 15:
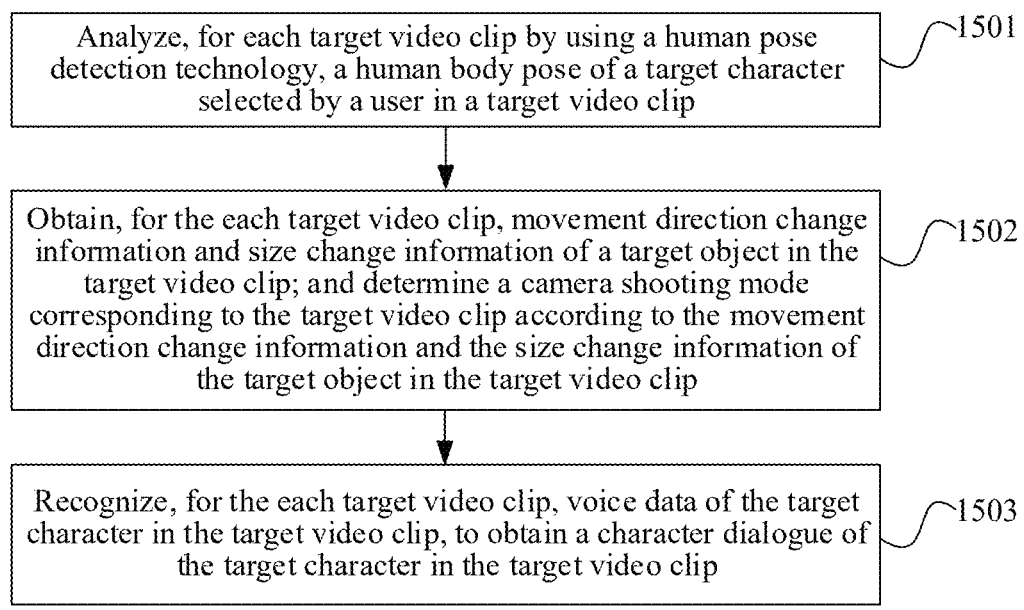
FIG. 15 is a flowchart of a video generation method according to an embodiment of the present disclosure.

In another embodiment, for the operation of "performing picture content analysis on one or more target video clips associated with the target character" described in step 405, the step may be performed by the server, or may be performed by the terminal. This is not specifically limited in this embodiment of the present disclosure. In one embodiment, referring to FIG. 15, the performing picture content analysis on one or more target video clips associated with the target character includes but is not limited to the following steps:

1501: Analyze, for each target video clip by using a human pose detection technology, a human body pose of a target character selected by a user in a target video clip.

As described above, the human body pose may include one or more of a facial expression, a facial orientation, or a body movement. In one embodiment, step 1501 may further include:

1501-1: Determine, for the each target video clip, human body key points of the target character in the target video clip according to the target video clip through a human body key point detection network.

Exemplarily, the human body key point detection network may be based on an OpenPose algorithm. The OpenPose algorithm is a deep learning algorithm based on a dual-branch multistage convolutional neural networks (CNNs) architecture, and mainly detects human body key points through an image recognition method. In other words, the OpenPose algorithm is a framework for detecting human body key point and can detect up to 135 key points of body, fingers, and face in the picture. In addition, the detection speed is very fast, which can achieve a real-time detection effect.

Using the OpenPose algorithm as an example, video frames included in each target video clip are inputted into the human body key point detection network, and the human body key point detection network may first obtain feature information through a backbone network of VGG-19 and then is continuously optimized through six stages. Each stage has two branches, one of which is used for obtaining heatmaps of human body key point coordinates, and the other branch is used for obtaining direction vectors PAFs pointing form a start point to an end point in terms of limb meaning between human body key points. Then, the PAFs are converted into a bipartite graph, and the bipartite graph matching problem is resolved by using a Hungarian algorithm, thereby obtaining human body key points in the picture.

Figure 16:
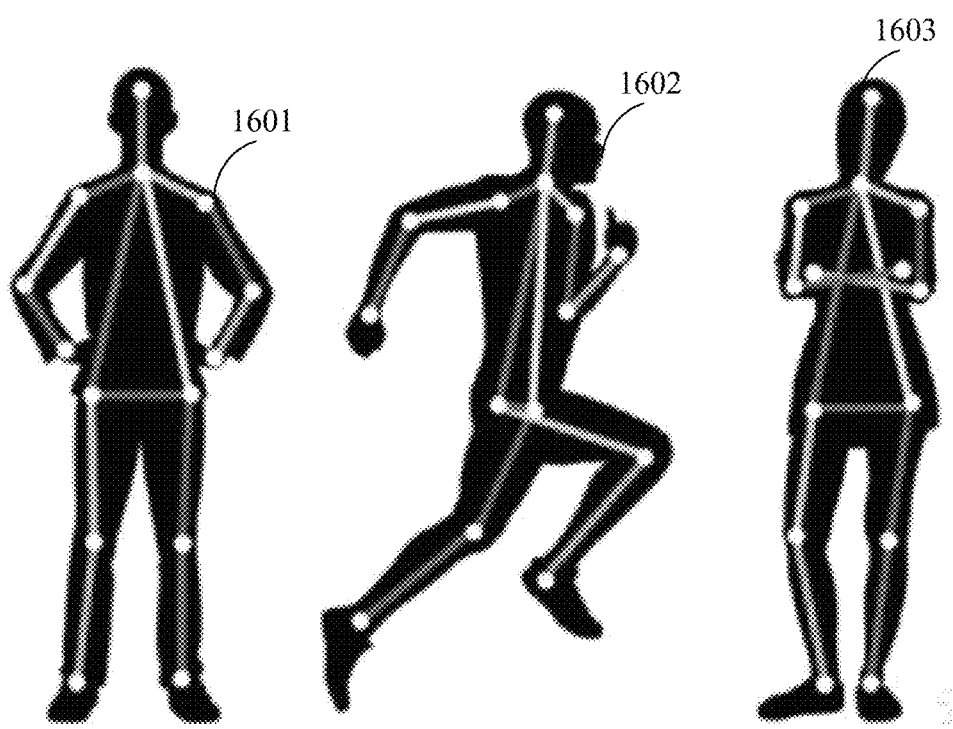
FIG. 16 is a schematic diagram of human body key points according to an embodiment of the present disclosure.

The human body key points detected by using the algorithm may be used for analyzing the facial expression, the facial orientation, and the body movement, and even can be used for tracking finger movement. Exemplarily, during estimation of the human body pose, as shown in FIG. 16, the detected human body key points may be connected according to a specific rule, to estimate the human body pose. FIG. 16 shows three different human body poses, namely, a standing pose 1601 with both hands akimbo, a running pose 1602, and a standing pose 1603 with both hands in front of the chest.

1501-2: Connect facial key points in the human body key points according to a relative position relationship between different facial parts, to obtain a facial architecture model; and determine a facial expression and a facial orientation of the target character in the each target video clip according to the facial architecture model.

Exemplarily, based on a relative positional relationship between different parts of the face, that is, according to a basic structure of the face, such as basic position rules of chin, mouth, nose, eyes and eyebrows, facial feature points are sequentially connected to generate a facial architecture model, and the facial architecture model can reflect the facial expression and facial orientation of the user.

1501-3: Connect body key points in the human body key points according to a relative position relationship between different body parts, to obtain a body architecture model; and determine a body movement of the target character in the each target video clip according to the body architecture model.

Exemplarily, based on a relative positional relationship between different parts of the body, that is, according to a basic structure of the human body, such as basic position rules of neck, shoulder, elbow, wrist, finger, waist, knee and ankle, body key points are sequentially connected to generate a body architecture model, and the body architecture model can reflect a body movement of the user, especially precise movements of user's fingers.

In this embodiment of the present disclosure, information such as the facial expressions (such as joy, anger, sadness, happiness), the facial orientation (such as facing right in the front or facing right), the body movement (such as raising an arm, kicking a leg, and the like) of the target character selected by the user in the first video is analyzed to be used as an interpretation of content of the video picture content, and such information is presented to the user through the UI in the form of the prompt message, thereby guiding the user to complete shooting intuitively and clearly.

1502: Obtain, for the each target video clip, movement direction change information and size change information of a target object in the target video clip; and determine a camera shooting mode corresponding to the target video clip according to the movement direction change information and the size change information of the target object in the target video clip.

In this step, a moving target object appearing in the video picture (for example, a person appearing in the video picture) is detected and tracked by using detection and tracking algorithms based on a grayscale image, to analyze and determine a movement direction trend and a size change trend of the moving target object in the video picture, and deduce the camera shooting mode of the video picture accordingly. In other words, the movement direction trend and the size change trend of the moving target object in the video picture are analyzed, to assist in determining how a lens moves in a corresponding video picture. In this way, the camera shooting mode is assisted to be determined and displayed on the shooting interface through the UI, thereby effectively guiding the user to shoot.

Figure 17:
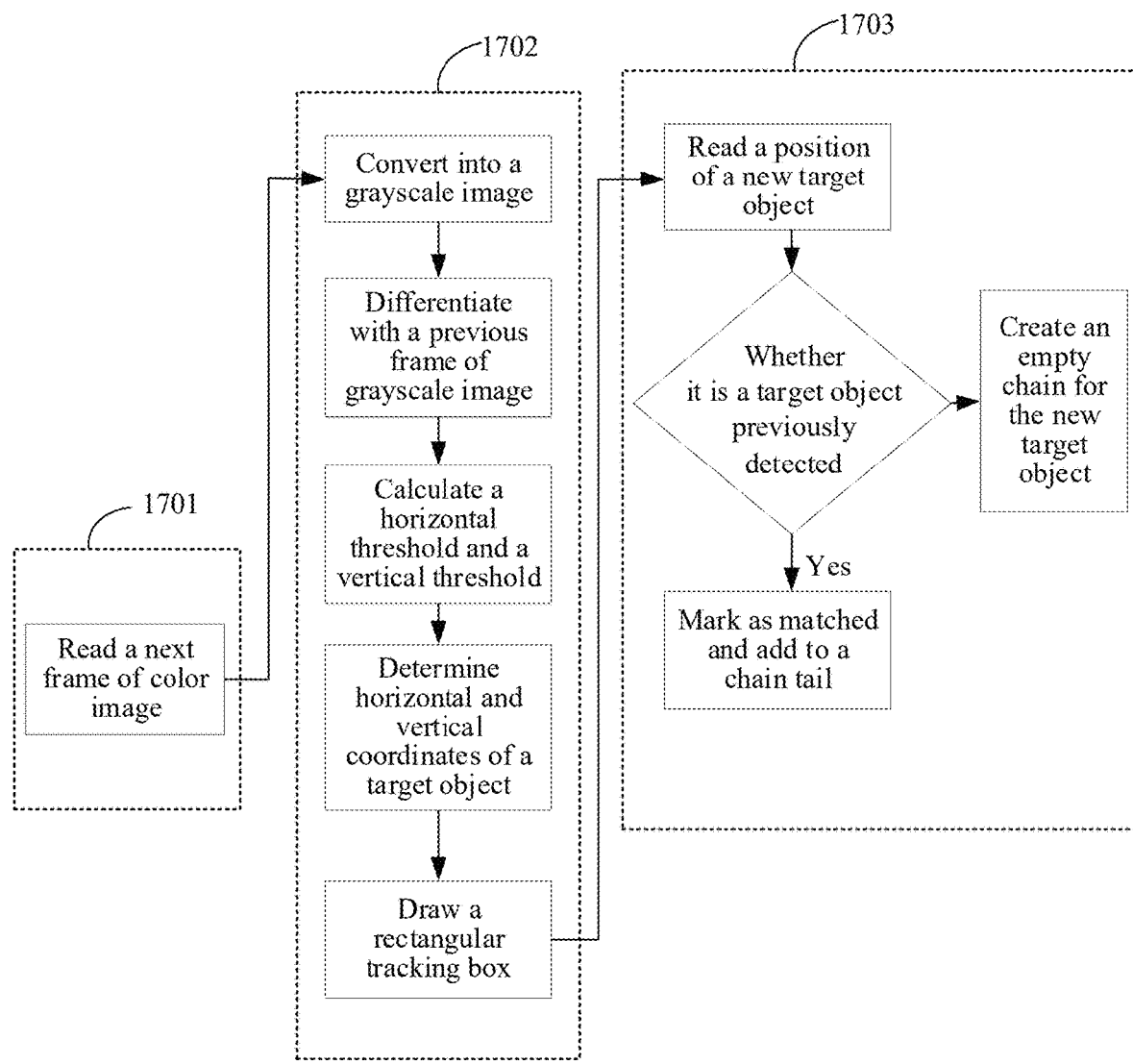
FIG. 17 is a schematic flowchart of detecting and tracking a mobile target object according to an embodiment of the present disclosure.

Briefly, the detection and tracking algorithms based on the grayscale image is: firstly, recognizing a contour of the target object in the video picture; and Then, converting multi-frame video pictures into gray images, and analyzing and calculating gray images of adjacent frames, to complete detection and tracking of the target object. Exemplarily, referring to FIG. 17, a general flow of the detection and tracking algorithm includes but is not limited to:

firstly, defining Main Win class 1701, Process class 1702, and Tracker class 1703. The Main Win class 1701 is used for initializing the camera, drawing a graphical interface, reading a next frame of color image from the camera and delivering it to the Process class 1702 for processing. The Process class 1702 is used for converting the next frame of color image into a grayscale image, and differentiating a current converted grayscale image from a previous frame of the grayscale image. Since simple frame difference method is difficult to achieve the detection accuracy, horizontal and vertical projection of the differentiated images may be used to complete the detection, that is, the differentiated images are respectively projected horizontally and vertically, and a horizontal threshold and a vertical threshold are calculated accordingly, where the horizontal threshold and the vertical threshold are used for segmenting the target object; and horizontal and vertical coordinates of the target object are determined according to the horizontal threshold and the vertical threshold, and a rectangular tracking box of the target object is drawn according to the horizontal and vertical coordinates. The Tracker class 1703 is used for tracking the target object, whether the target object is a new target or a target object that already exists in the previous image frame and continues to move in the current image frame is first analyzed, and then corresponding operations are performed on different analysis results. For example, when the target object is a target object previously detected, the target object is marked as matched and added to a chain tail; and when the target object is not previously detected, an empty chain is created for the newly appearing target object. An empty chain is usually created for each newly appearing target object to track the subsequent process.

In addition, for example, the determining a camera shooting mode corresponding to the target video clip according to the movement direction change information and the size change information of the target object in each target video clip may be: for example, the lens is pushed when a grayscale image of the target object between two adjacent frames is gradually larger; and in another example, the lens shakes to the right when a grayscale image of a current target object gradually moves to the left side of the picture. In addition, the target object herein may be a target character selected by the user. This is not specifically limited in this embodiment of the present disclosure.

1503: Recognize, for the each target video clip, voice data of the target character in the target video clip, to obtain a character dialog of the target character in the target video clip.

In this embodiment of the present disclosure, whether a character dialog related to the target character is included in each target video clip where the target character appears is recognized through a voice recognition technology, and UI presentation may be performed on the shooting interface when there is a character dialog related to the target character, to inform the user of text content to be read out during shooting.

In addition, during video synthesis processing, a face swapping operation is further included when the target character selected by the user and another character is in the same frame. In one embodiment, the Deepfake technology can be used to perform face swapping.

The Deepfake technology includes "deep machine learning" and "fake photo", which is essentially a technical framework of deep learning model in the field of image synthesis and replacement, and is a successful application of depth image generation model. An Encoder-Decoder self-coding and decoding architecture is used during model building. Any distorted face is restored in a test stage, and a whole process includes five steps: obtaining normal face photos→distorting and transforming face photos→encoding a vector→decoding a vector→restoring normal face photos.

Generally, the face swapping process of the Deepfake technology is mainly divided into: face positioning, face swapping, and image stitching. The face positioning is to extract feature points of an original face, for example, left and right eyebrows, nose, mouth, and chin. The feature points roughly describe organ distribution of the face. Exemplarily, the feature points may be directly extracted through mainstream toolkits, such as dlib and OpenCV, and the toolkits generally adopts a classic histogram of oriented gradient (HOG) face marking algorithm. For face swapping, GAN or VAE generation model is adopted, to generate a face B with an expression A. The final image mosaic is to fuse the face into a background of the original image, to achieve the effect of only swapping the face. In addition, when an object to be processed is a video, images need to be processed frame by frame, and then the processed results is re-stitched into the video.

Figure 18:
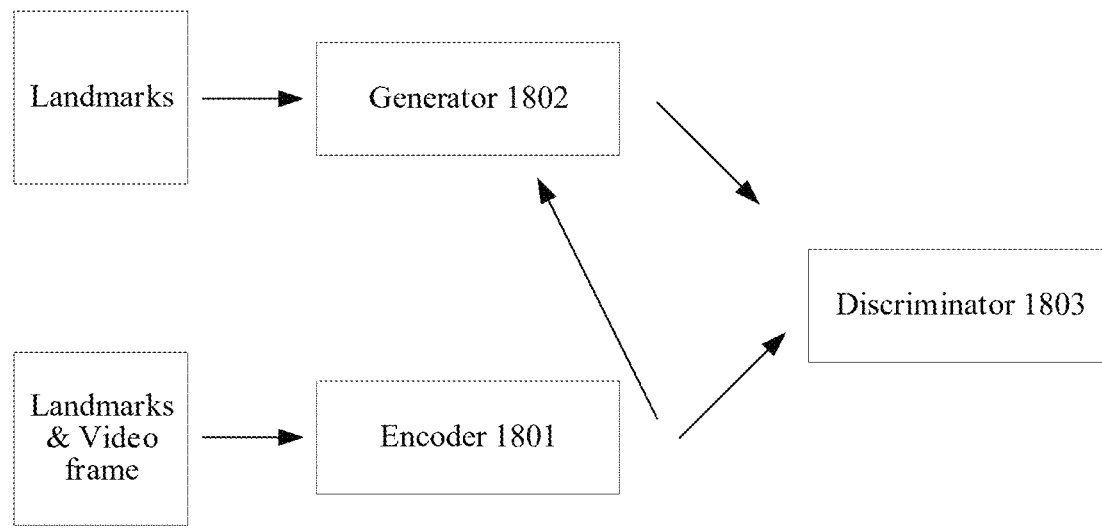
FIG. 18 is an architectural diagram of a Deepfake technology according to an embodiment of the present disclosure.

FIG. 18 shows main architecture involved in the Deepfake technology. As shown in FIG. 18, the architecture mainly includes three parts, namely, an encoder 1801, a generator 1802, and a discriminator 1803. For the encoder 1801, a video and landmarks of the video (obtained by connecting key points of the face into a line) are inputted and an N-dimensional vector is outputted. The encoder 1801 is configured to learn specific information of a video (for example, identity invariance of the character), and is expected to have invariance of pose. It can be considered that, the same as the face recognition network, one video corresponds to one feature, and the feature of the face image in the video shall not be far from the feature of the whole video, but a feature distance between different videos is very large. The generator 1802 is configured to generate a fake image based on landmarks. It is noteworthy that part of the input of the generator 1802 comes from the encoder 1801. For example, according to a face shape given by landmarks, the generator 1802 completes the face shape according to the given face shape by using specific face information learned by the encoder 1801, thereby achieving the effect of face swapping. The discriminator 1803 includes two parts, one of which is an encoder network that encodes the image as a vector; and the other of which includes an operation of multiplying a parameter W with the vector.

In this embodiment of the present disclosure, based on the foregoing technical solutions, the human body pose and the character dialog of the target character selected by the user in the first video and the camera shooting mode may be analyzed and determined, so that UI presentation may be performed on the prompt message, help the user to better shoot, thereby significantly enhancing the degree of content restoration of the original video by the video shot by the user, and improving the sense of reality of content synthesis.

The overall execution flow of the video generation method provided in this embodiment of the present disclosure is described below.

Using an example in which the server selects video clips and performs picture content analysis on the original video, the execution flow may be implemented by three parts, namely, a user side, a terminal side, and a server side. In a user operation flow, corresponding technical capability matching may be generated between the terminal side and the server side. Operations performed on the terminal side may include the following: face recognition, video clip generation preview, UI element delivery, camera call, video synthesis, and the like. Operations performed on the server side may include the following: video time points dotting, video content analysis (for example, the facial orientation, the facial expression, the lens movement, and the body movement), and the like.

Figure 19:
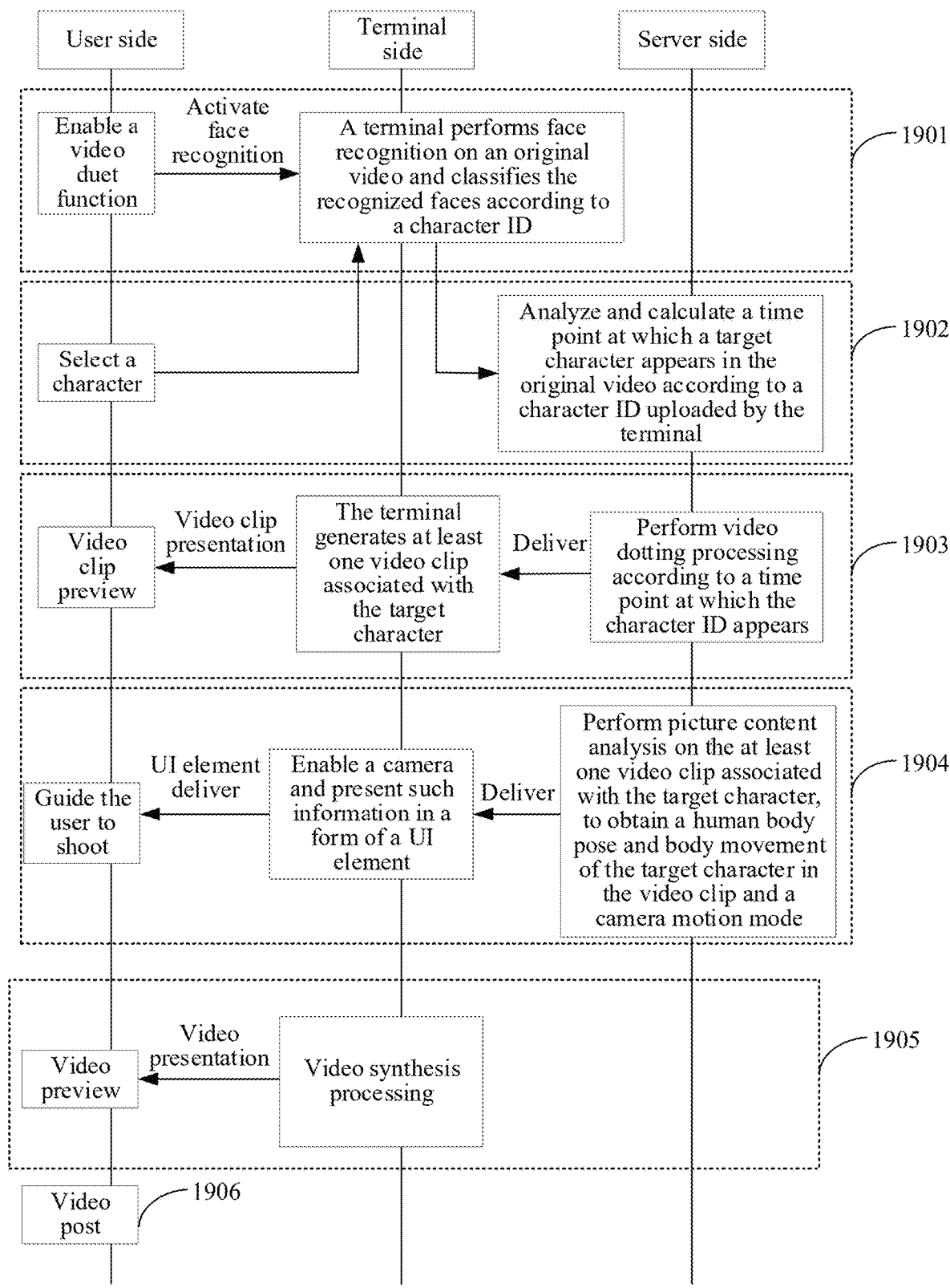
FIG. 19 is a schematic diagram of an overall execution flow of a video generation method according to an embodiment of the present disclosure.

Referring to FIG. 19, a method process provided in this embodiment of the present disclosure includes:

1901: During playback of the original video, the user performs a trigger operation for the video duet option displayed on the shooting interface on the terminal, to enable the video duet function and activate the terminal to perform face recognition. Correspondingly, the terminal performs face recognition on an original video and classifies the recognized faces according to a character ID, and displays the character ID on the shooting interface, for the user to select a character.

1902: The user selects the character, and correspondingly, the terminal uploads a character ID of the target character selected by the user to the server.

1903: The server analyzes and calculates a target time point at which a target character appears in the original video according to a character ID uploaded by the terminal; and performs video dotting processing according to the target time point at which the character ID appears, and returns the target time point at which the character ID appears and the video dotting information to the terminal, to enable the terminal to generate at least one target video clip associated with the target character and present preview pictures of the target video clips to the user, so that the user may preview the target video clip where the target character selected by the user appears.

1904: The server performs picture content analysis on the target video clips associated with the target character, to obtain a human body pose and a body movement of the target character in the video clip and the camera shooting mode and deliver such information to the terminal; and the terminal enables a camera and present such information in a form of a UI element, to guide the user to shoot.

1905: The terminal performs content updates the content of the original video based on the video shot by the user, to obtain a duet video and generate a preview picture of the duet video, for the user to preview the duet video.

1906: After completing preview, the user may perform an operation such as video posting.

Based on the method provided in this embodiment of the present disclosure, the terminal may display the video duet option on the playback interface of the video watched by the user. Then, the terminal may perform video shooting in response to a trigger operation for the video duet option by the user. During video shooting, the terminal may automatically display a prompt message on the shooting interface, where the prompt message is used for guiding the user to perform video shooting. That is, the prompt message may be presented on the shooting interface of the user, to guide the user to quickly complete shooting with good quality. Finally, the video currently shot is fused into video content of the original video based on recognition of the target character and another character in the original video, thereby implementing video duet. The video generation method can not only achieve a high-quality video shooting effect, but also significantly reduce shooting costs. The method can reach a higher level in lens presentation and character performance, and simultaneously speed up the completion of video shooting, thereby saving time and labor costs.

That is, in the video duet scenario, in this embodiment of the present disclosure, the prompt message beneficial to the shooting of the user can be outputted by analyzing the video picture content, thereby helping the user to quickly participate in a video creation process. In other words, on the premise of analyzing the video picture content, in this embodiment of the present disclosure, the prompt message is presented to the user to guide shooting of the user. The prompt message includes various content, for example, one or more of the camera shooting mode, the human body pose, or the character dialog.

In addition, in the video duet mode based on scenario fusion, the original video and the video shot by the user are synthesized into one video, that is, the duet video only includes one video in terms of picture presentation, so that the original video and the video shot by the user are played in a linearly interspersed manner according to a chronological order, thereby ensuring seamless connection and creation effect of the video, which has a better video creation process. In other words, according to the video duet mode, based on existing video picture content, the user can participate in the video creation process in a more natural and immersive manner, and the final duet video may have a higher degree of fusion from the perspective of the user, that is, the duet video is more compatible with the original video in content presentation and character performance, thereby avoiding stiff stitching between two videos.

As an example, FIG. 20 to FIG. 28 show product renderings of video duet implemented based on the video generation method provided in this embodiment of the present disclosure. The video generation method provided in this embodiment of the present disclosure is described with reference to FIG. 20 to FIG. 28.

Figure 20:
FIG. 20 is a schematic diagram of another user interface according to an embodiment of the present disclosure.
Figure 21:
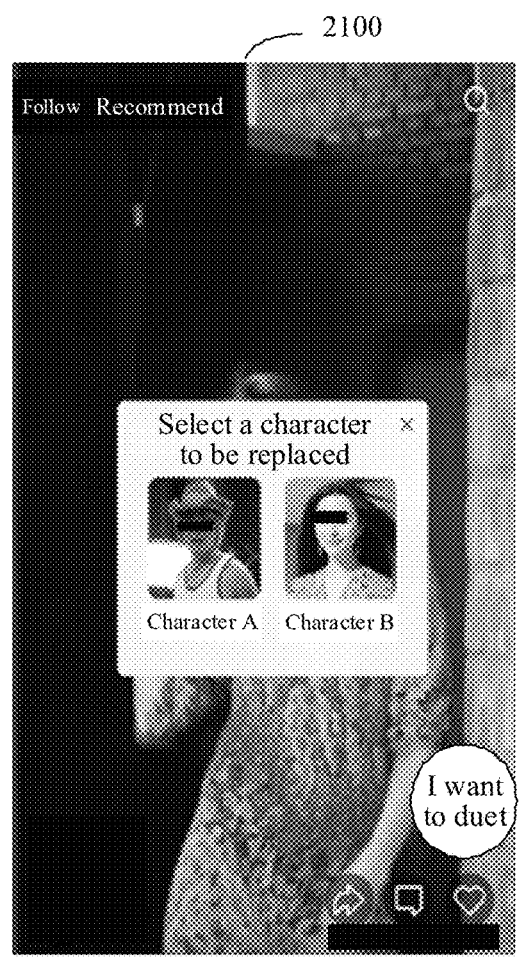
FIG. 21 is a schematic diagram of another user interface according to an embodiment of the present disclosure.

FIG. 20 shows a playback interface 2000 of the original video, a video duet option "I want to duet" is displayed on the playback interface 2000, and a user interface 2100 shown in FIG. 21 may be displayed after the user triggers the video duet option. The user interface 2100 displays two character options, namely, a character A and a character B, and the user may select any one of the two characters to shoot in a replacement manner. For example, after the user taps the video duet option, the terminal may prompt through a pop-up window that there are two characters can be shot in the video, and the user may select one of the characters for replacement, that is, the user performs picture content of the selected character. As an example, character options of the character A and the character B may be respectively presented by corresponding character pictures.

Figure 22:
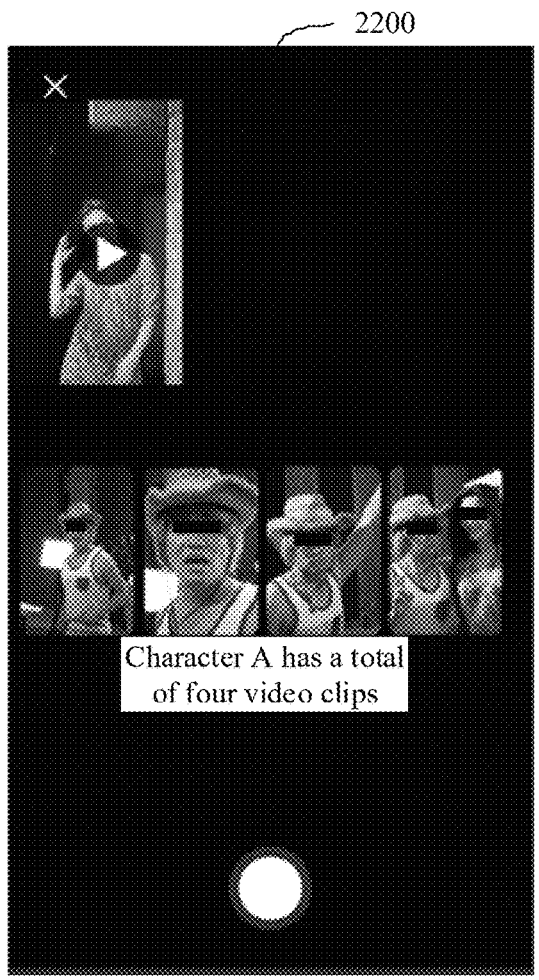
FIG. 22 is a schematic diagram of another user interface according to an embodiment of the present disclosure.

When the user selects one character (for example, the character A) on the user interface 2100 shown in FIG. 21, the terminal may display preview pictures respectively corresponding to four video clips including the character A on a playback interface 2200 shown in FIG. 22. The four video clips are video clips including the character A selected from the original video, and the user may watch the video clips at will. Exemplarily, the preview pictures of the four video clips may be presented on the playback interface in a tiled manner or in a list manner, and the preview pictures of the four video clips may be a first frame, a key frame, or a randomly selected video frame of the each video clip. This is not specifically limited in this embodiment of the present disclosure.

As shown in FIG. 23 to FIG. 26, in the video shooting process, the terminal may display the target video clips to be imitated and performed by the user in an upper left corner of the user interface, to prompt the user without occupying much space of the user interface. In addition to the upper left corner, the video clips to be imitated and performed by the user may be displayed at a position such as an upper right corner, a lower left corner, or a lower right corner of the user interface. This is not specifically limited in this embodiment of the present disclosure.

In this embodiment of the present disclosure, FIG. 23 to FIG. 26 further show different types of prompt messages displayed on the user interface.

Figure 23:
FIG. 23 is a schematic diagram of another user interface according to an embodiment of the present disclosure.

According to FIG. 23, after performing picture content analysis on the original video and learning about that the user needs to shoot facing to the right at this time, the terminal may correspondingly display a prompt message on a user interface 2300, to guide the user to shoot, so that the video picture shot by the user has a higher degree of matching with the characters and a picture logic in the original video. As shown in FIG. 23, the prompt message presented on the user interface 2300 at this time includes: a prompt icon of a facial orientation and prompt text "face to the right".

Figure 24:
FIG. 24 is a schematic diagram of another user interface according to an embodiment of the present disclosure.

According to FIG. 24, to ensure that the user can truly restore the shooting process to ensure that the shot video is highly consistent with the original video, the prompt message may further include a camera shooting mode. As shown in FIG. 24, it can be seen from picture content analysis performed on the original video that, a picture of pushing a lens is currently shown, and the terminal may present a prompt icon (as shown by arrows in FIG. 24) and prompt text (picture advancing) of the camera shooting mode on a user interface 2400, to inform the user how to control a lens. In addition, the terminal may further present a character dialog matching the current shooting progress, to inform the user of text content to be read out during shooting. FIG. 24 shows that the user needs to read out the character dialog "Shall we take a photo together?" while advancing the picture.

Figure 25:
FIG. 25 is a schematic diagram of another user interface according to an embodiment of the present disclosure.

According to FIG. 25, the prompt message may further include a body movement. For example, it can be seen from picture content analysis performed on the original video that, a left arm of a current character is raised, and the terminal may also synchronously present the body movement on a user interface 2500, that is, presenting a prompt icon and prompt text of the body movement on the user interface 2500. As shown in FIG. 25, the prompt icon may be "Little Man in Motion", and the prompt text may be "Raise a left arm". In addition, the user further needs to read out a character dialog "Really?" while performing the body movement.

Figure 26:
FIG. 26 is a schematic diagram of another user interface according to an embodiment of the present disclosure.

According to FIG. 26, the prompt message may further include a facial expression. That is, a prompt icon and prompt text of the facial expression may further be presented on a user interface 2600. For example, it can be seen from picture content analysis performed on the original video that, a current character smile to the right, and the terminal may also synchronously present the facial expression on the user interface 2600, that is, presenting a prompt icon and prompt text of the facial expression on the user interface. As shown in FIG. 26, the prompt icon may be "a smiling face" and the prompt text may be "smiling to the left".

Figure 27:
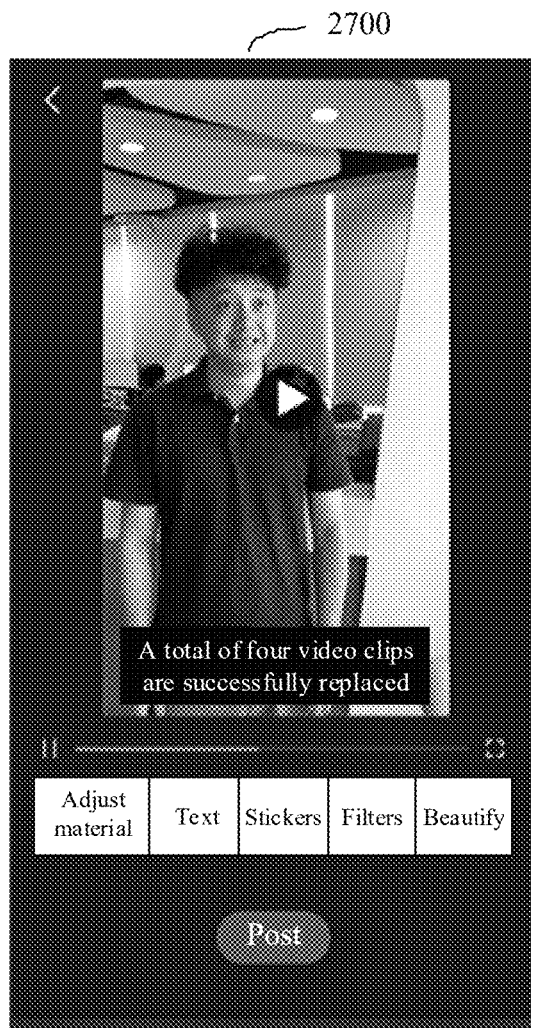
FIG. 27 is a schematic diagram of another user interface according to an embodiment of the present disclosure.

As shown in FIG. 27, after the duet video is generated, the terminal may display a preview picture, a playback option, a playback progress bar, and a video modification option of the duet video on a user interface 2700. There may be a plurality of video modification options, and merely five video modification options are exemplarily shown in FIG. 11, namely, adjusting material, text, stickers, filters, and beautifying. It may be understood that, a quantity of the video modification options may be greater than or less than five as shown in the figure. This is not specifically limited in this embodiment of the present disclosure.

Figure 28:
FIG. 28 is a schematic diagram of another user interface according to an embodiment of the present disclosure.

For example, that "the original video and the video shot by the user are played in a linearly interspersed manner according to a chronological order" is described below with reference to FIG. 28. FIG. 28 shows several video pictures captured in the duet video, and the video pictures are sorted in chronological order from left to right. In FIG. 28, the several video pictures 1 to 7 are sorted in an order from left to right, a video picture 1, a video picture 3 and a video picture 5 are captured from the original video, a video picture 2, a video picture 4, and a video picture 6 are captured from the video shot by the user, and a video picture 7 is obtained by performing face swapping on a target character included in a corresponding video picture in the original video, that is, replacing the facial image of the target character with the user facial image. During playback of the duet video, since the several video pictures shown in FIG. 28 are sequentially presented in chronological order from left to right, and the original video picture and the user shot video are played in an interspersed manner, the video duet mode achieves scenario-based fusion between the original video and the video shot by the user.

Figure 29:
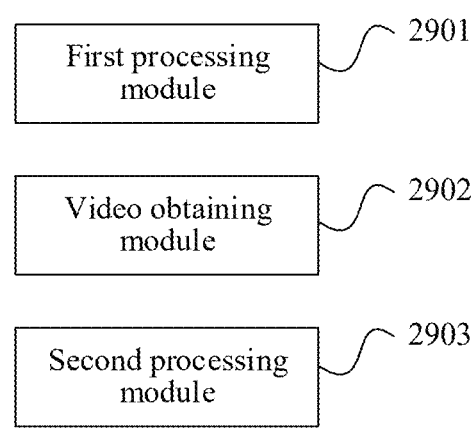
FIG. 29 is a schematic structural diagram of a video generation apparatus according to an embodiment of the present disclosure.

FIG. 29 is a schematic structural diagram of a video generation apparatus according to an embodiment of the present disclosure. Referring to FIG. 29, the apparatus includes:

a first processing module 2901, configured to perform video shooting in response to a trigger operation for a video duet option;

a video obtaining module 2902, configured to obtain a second video currently shot, the second video corresponding to a video clip including a target character in a first video; and a second processing module 2903, configured to fuse the second video into video content of the first video based on one or more characters recognized in the first video, to obtain a duet video.

In one embodiment, the apparatus further includes:

a message obtaining module, configured to obtain a prompt message based on recognition of picture content of the first video, the prompt message being used for instructing the video shooting of the second video; and a first display module, configured to display the prompt message on a shooting interface during the video shooting of the second video.

In one embodiment, the second processing module is configured to replace the video clip including the target character in the first video with the second video when the first video does not include a same-frame picture that includes the target character and at least one other character of the one or more recognized characters.

In one embodiment, the second processing module is configured to replace a facial image of the target character in the same-frame picture with a user facial image in the second video when the first video includes a same-frame picture that includes the target character and at least one other character of the one or more recognized characters.

In one embodiment, the prompt message includes one or more of a camera shooting mode, a human body pose, or a character dialog; and the first display module is configured to: display at least one or more of the following: at least one of a prompt icon or prompt text of the camera shooting mode on the shooting interface; display at least one of a prompt icon or prompt text of the human body pose on the shooting interface, the human body pose including one or more of a facial expression, a facial orientation, or a body movement; and display the character dialog on the shooting interface.

In one embodiment, the first video includes N characters, N being a positive integer and N≥2, and the apparatus further includes:

a second display module, configured to display N character options on a playback interface of the first video before the performing video shooting in response to a trigger operation for a video duet option; and a third processing module, configured to select M video clips including the target character from the first video as target video clips in response to a trigger operation for a target character option in the N character options, where M is a positive integer.

In one embodiment, the second display module is further configured to display a preview picture corresponding to one of the target video clips on the playback interface; and the third processing module is further configured to play the designated target video clip in response to a trigger operation for a preview picture of a designated target video clip.

In one embodiment, the apparatus further includes:
a third display module, configured to display a video window on the shooting interface in a floating manner, the video window being used for displaying a video clip corresponding to the prompt message in the first video.

In one embodiment, the apparatus further includes:
a fourth display module, configured to display a preview picture, a playback option, a playback progress bar, and a video modification option of the duet video after the duet video is generated;
a fourth processing module, configured to play the duet video in response to the trigger operation for a playback option, where
the fourth display module is further configured to play a playback progress of the duet video through the playback progress bar; and
a fifth processing module, configured to modify the duet video in response to a trigger operation for the video modification option.

In one embodiment, the third processing module is configured to determine a target time point at which the target character appears in the first video; mark the target time point with a key frame, to obtain video dotting information; and stitch the M target video clips from the first video according to the video dotting information and the target time point.

In one embodiment, the message obtaining module is further configured to perform picture content analysis on one or more target video clips, to obtain one or more prompt messages corresponding to the one or more target video clips; and
the first display module is further configured to display the one or more prompt messages corresponding to the one or more target video clips on the shooting interface in a process of shooting the second video according to the one or more target video clips.

In one embodiment, the message obtaining module is configured to: determine, for the each target video clip, human body key points of the target character in the target video clip according to the target video clip through a human body key point detection network; connect facial key points in the human body key points according to a relative position relationship between different facial parts, to obtain a facial architecture model; then determine a facial expression and a facial orientation of the target character in the each target video clip according to the facial architecture model; and connect body key points in the human body key points according to a relative position relationship between different body parts, to obtain a body architecture model; then determine a body movement of the target character in the each target video clip according to the body architecture model.

In one embodiment, the message obtaining module is further configured to obtain, for the each target video clip, movement direction change information and size change information of a target object in the target video clip; and determine a camera shooting mode corresponding to the target video clip according to the movement direction change information and the size change information of the target object in the target video clip.

In one embodiment, The message obtaining module is further configured to recognize, for the each target video clip, voice data of the target character in the target video clip, to obtain a character dialog of the target character in the target video clip.

In one embodiment, the first display module is further configured to display an error prompt message on the shooting interface when a video picture currently shot by a camera does not match the prompt message currently displayed. The error prompt message is used for guiding the user to re-shoot the video.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

Any combination of the foregoing example technical solutions may be used to form another example embodiment of the present disclosure. Details are not described herein again.

When the video generation apparatus provided in the foregoing embodiments generates the video, the division of the foregoing functional modules is merely an example for description. In the practical application, the functions may be assigned to and completed by different functional modules according to the requirements, that is, the internal structure of the device is divided into different functional modules, to implement all or some of the functions described above. In addition, the video generation apparatus and method embodiments of the video generation method provided in the foregoing embodiments belong to the same conception. For the specific implementation process, reference may be made to the method embodiments, and details are not described herein again.

Figure 30:
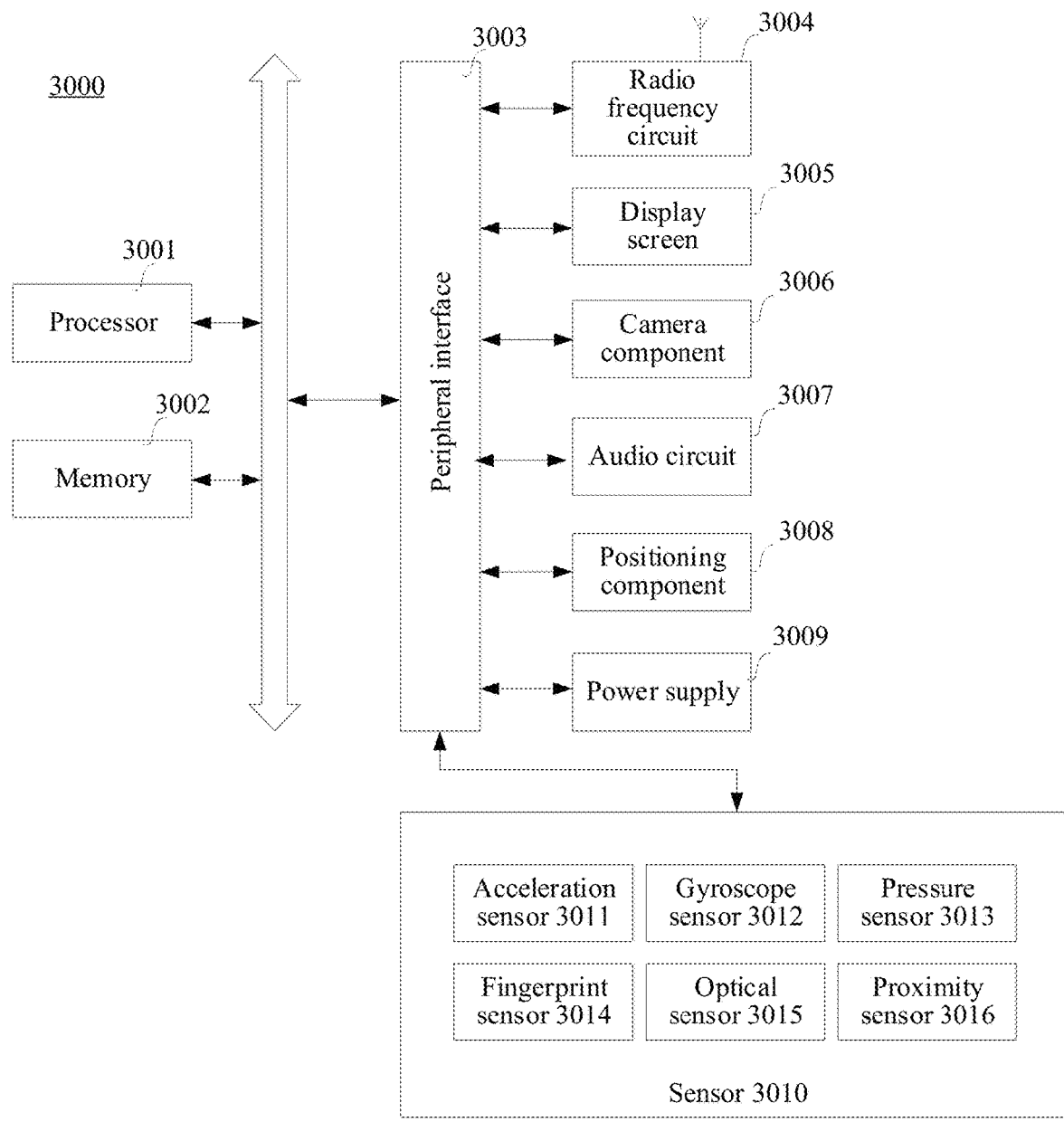
FIG. 30 is a schematic structural diagram of an electronic device according to an embodiment of the present disclosure.

FIG. 30 shows a structural block diagram of an electronic device 3000 according to an exemplary embodiment of the present disclosure. The electronic device 3000 may be configured to implement the video generation method provided in the foregoing method embodiments.

The device 3000 may be a portable mobile terminal, for example, a smartphone, a tablet computer, a Moving Picture Experts Group Audio Layer III (MP3) player, a Moving Picture Experts Group Audio Layer IV (MP4) player, a notebook computer, or a desktop computer. The device 3000 may also be referred to as user equipment, a portable terminal, a laptop terminal, a desktop terminal, or another name.

Generally, the device 3000 includes a processor 3001 and a memory 3002.

The processor 3001 may include one or more processing cores, and may be, for example, a 4-core processor or an 8-core processor. The processor 3001 may be implemented in at least one hardware form of a digital signal processor (DSP), a field-programmable gate array (FPGA), and a programmable logic array (PLA). The processor 3001 may alternatively include a main processor and a coprocessor. The main processor is configured to process data in an awake state, also referred to as a central processing unit (CPU). The coprocessor is a low-power processor configured to process data in a standby state. In some embodiments, the processor 3001 may be integrated with a graphics processing unit (GPU). The GPU is configured to render and draw content that needs to be displayed on a display. In some embodiments, the processor 3001 may further include an artificial intelligence (AI) processor. The AI processor is configured to process computing operations related to machine learning.

The memory 3002 may include one or more computer-readable storage media. The computer-readable storage medium may be non-transient. The memory 3002 may further include a high-speed random access memory and a non-volatile memory, for example, one or more disk storage devices or flash storage devices. In some embodiments, a non-transient computer-readable storage medium in the memory 3002 is configured to store at least one piece of program code, and the at least one piece of program code is configured to be executed by the processor 3001 to implement the video generation method provided in the embodiments of the present disclosure.

In some embodiments, the device 3000 may include: a peripheral interface 3003 and at least one peripheral. The processor 3001, the memory 3002, and the peripheral interface 3003 may be connected by a bus or a signal line. Each peripheral may be connected to the peripheral interface 3003 by using a bus, a signal cable, or a circuit board. Specifically, the peripheral device includes: at least one of a radio frequency (RF) circuit 3004, a touch display screen 3005, a camera component 3006, an audio circuit 3007, a positioning component 3008, and a power supply 3009.

Figure 31:
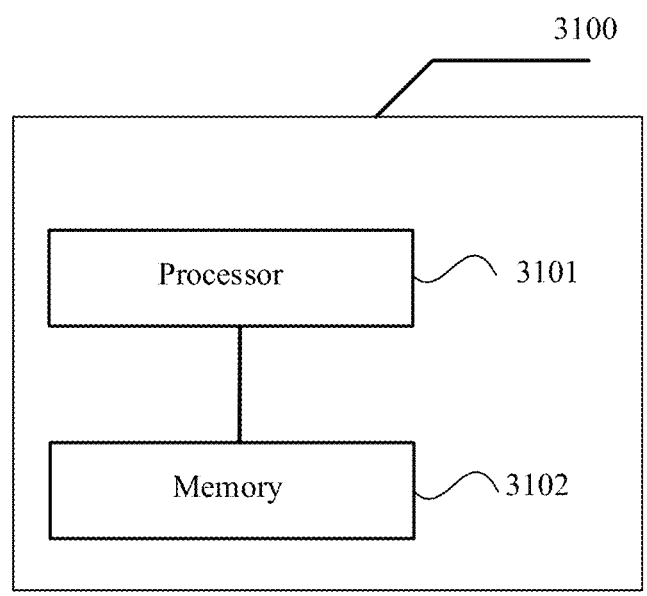
FIG. 31 is a schematic structural diagram of an electronic device according to an embodiment of the present disclosure.

FIG. 31 is a schematic structural diagram of an electronic device according to an embodiment of the present disclosure. The electronic device 3100 may vary greatly due to different configurations or performance, and may include one or more processors (such as CPUs) 3101 and one or more memories 3102. The memory 3102 stores at least one piece of program code, the at least one piece of program code being loaded and executed by the processor 3101 to implement the video generation method provided in the foregoing method embodiments. Certainly, the electronic device may further include components such as a wired or wireless network interface, a keyboard, and an input/output (I/O) interface, to facilitate input and output. The electronic device may further include another component configured to implement a function of a device. Details are not further described herein.

In an exemplary embodiment, a computer-readable storage medium, for example, a memory including at least one piece of program code is further provided. The at least one piece of program code may be executed by a processor in a terminal to implement the video generation method in the foregoing embodiments. For example, the computer-readable storage medium may be a read-only memory, ROM), a RAM, a compact disc ROM (CD-ROM), a magnetic tape, a floppy disk, an optical data storage device, or the like.

An exemplary embodiment further provides a computer program product or a computer program is provided, the computer program product or the computer program including computer program code, the computer program code being stored in a computer-readable storage medium, a processor of an electronic device reading the computer program code from the computer-readable storage medium, and the processor executing the computer program code to cause the electronic device to perform the foregoing video generation method provided in the foregoing embodiments.

What is claimed is:

1. A video generation method, performed by an electronic device, the method comprising:
performing video shooting in response to a trigger operation for a video duet option;
obtaining a second video currently shot, the second video corresponding to a video clip comprising a target character in a first video; and
fusing the second video into video content of the first video based on one or more characters recognized in the first video, to obtain a duet video, the one or more characters including the target character,
wherein the fusing the second video into the video content of the first video, to obtain the duet video, comprises:
determining whether the first video comprises a same-frame picture that includes the target character and at least one other character of the one or more recognized characters;
in response to determining that the first video does not comprise the same-frame picture that includes the target character and at least one other character of the one or more recognized characters, replacing the video clip comprising the target character in the first video with the second video; and
in response to determining that the first video comprises the same-frame picture that includes the target character and at least one other character of the one or more recognized characters, replacing a facial image of the target character in the same-frame picture with a user facial image in the second video.

2. The method according to claim 1, further comprising:
obtaining a prompt message based on recognition of picture content of the first video, the prompt message being used for instructing the video shooting of the second video; and
displaying the prompt message on a shooting interface during the video shooting of the second video.

3. The method according to claim 2, wherein the prompt message comprises one or more of a camera shooting mode, a human body pose, or a character dialog; and the displaying the prompt message on a shooting interface comprises:
displaying at least one of a prompt icon or prompt text of the camera shooting mode on the shooting interface;
displaying at least one of a prompt icon or prompt text of the human body pose on the shooting interface, the human body pose comprising one or more of a facial expression, a facial orientation, or a body movement; and
displaying the character dialog on the shooting interface.

4. The method according to claim 2, further comprising:
displaying a video window on the shooting interface in a floating manner, the video window being used for displaying a video clip corresponding to the prompt message in the first video.

5. The method according to claim 2, wherein the obtaining a prompt message based on recognition of picture content of the first video comprises:
performing picture content analysis on one or more target video clips comprising the target character in the first video, to obtain one or more prompt messages corresponding to the one or more target video clips; and
the displaying the prompt message on a shooting interface during the video shooting of the second video comprises:
displaying the one or more prompt messages corresponding to the one or more target video clips on the shooting interface in a process of shooting the second video according to the one or more target video clips.

6. The method according to claim 5, wherein the performing picture content analysis on one or more target video clips comprising the target character in the first video comprises: for one target video clip of the one or more target video clips:
- determining human body key points of the target character in the target video clip through a human body key point detection network;
- connecting facial key points in the human body key points according to a relative position relationship between different facial parts, to obtain a facial architecture model; then determining a facial expression and a facial orientation of the target character in the target video clip according to the facial architecture model; and
- connecting body key points in the human body key points according to a relative position relationship between different body parts, to obtain a body architecture model; then determining a body movement of the target character in the target video clip according to the body architecture model.

7. The method according to claim 5, wherein the performing picture content analysis on one or more target video clips comprising the target character in the first video comprises: for one target video clip of the one or more target video clips:
- obtaining movement direction change information and size change information of a target object in the target video clip; and determining a camera shooting mode corresponding to the target video clip according to the movement direction change information and the size change information of the target object in the target video clip.

8. The method according to claim 5, wherein the performing picture content analysis on one or more target video clips comprising the target character in the first video comprises: for one target video clip of the one or more target video clips:
- recognizing voice data of the target character in the target video clip, to obtain a character dialog of the target character in the target video clip.

9. The method according to claim 2, further comprising:
- displaying an error prompt message on the shooting interface when a video picture currently shot by a camera does not match the prompt message currently displayed.

10. The method according to claim 1, wherein the first video comprises N characters, N being an integer greater than or equal to 2, the N characters comprising the target character; and the method further comprises:
- displaying character options respectively corresponding to the N characters on a playback interface of the first video before the performing video shooting in response to a trigger operation for a video duet option; and
- selecting M video clips comprising the target character from the first video as target video clips in response to a trigger operation for a character option corresponding to the target character, M being a positive integer.

11. The method according to claim 10, further comprising:
- displaying a preview picture corresponding to one of the target video clips on the playback interface; and
- playing the designated target video clip in response to a trigger operation for a designated target video clip.

12. The method according to claim 10, wherein the selecting M video clips comprising the target character from the first video as target video clips comprises:
- determining a target time point at which the target character appears in the first video;
- marking the target time point with a key frame, to obtain video dotting information; and
- stitching the M target video clips from the first video according to the video dotting information and the target time point.

13. The method according to claim 1, further comprising:
- displaying a preview picture, a playback option, a playback progress bar, and a video modification option of the duet video after the duet video is obtained;
- playing the duet video in response to a trigger operation for the playback option, and displaying a playback progress of the duet video through the playback progress bar; and
- modifying the duet video in response to a trigger operation for the video modification option.

14. A video generation apparatus, comprising: a processor and a memory, the memory storing at least one piece of program code, the at least one piece of program code being loaded and executed by the processor to implement:
- performing video shooting in response to a trigger operation for a video duet option;
- obtaining a second video currently shot, the second video corresponding to a video clip comprising a target character in a first video; and
- fusing the second video into video content of the first video based on one or more characters recognized in the first video, to obtain a duet video, the one or more characters including the target character,
- wherein the fusing the second video into the video content of the first video, to obtain the duet video, comprises:
  - determining whether the first video comprises a same-frame picture that includes the target character and at least one other character of the one or more recognized characters;
  - in response to determining that the first video does not comprise the same-frame picture that includes the target character and at least one other character of the one or more recognized characters, replacing the video clip comprising the target character in the first video with the second video; and
  - in response to determining that the first video comprises the same-frame picture that includes the target character and at least one other character of the one or more recognized characters, replacing a facial image of the target character in the same-frame picture with a user facial image in the second video.

15. The apparatus according to claim 14, wherein the processor is further configured to perform:
- obtaining a prompt message based on recognition of picture content of the first video, the prompt message being used for instructing the video shooting of the second video; and
- displaying the prompt message on a shooting interface during the video shooting of the second video.

16. A non-transitory computer-readable storage medium, storing at least one piece of program code, the at least one piece of program code being loaded and executed by a processor to implement:
- performing video shooting in response to a trigger operation for a video duet option;
- obtaining a second video currently shot, the second video corresponding to a video clip comprising a target character in a first video; and
- fusing the second video into video content of the first video based on one or more characters recognized in the first video, to obtain a duet video, the one or more characters including the target character, wherein the fusing the second video into the video content of the first video, to obtain the duet video, comprises:

determining whether the first video comprises a same-frame picture that includes the target character and at least one other character of the one or more recognized characters;

in response to determining that the first video does not comprise the same-frame picture that includes the target character and at least one other character of the one or more recognized characters, replacing the video clip comprising the target character in the first video with the second video; and in response to determining that the first video comprises the same-frame picture that includes the target character and at least one other character of the one or more recognized characters, replacing a facial image of the target character in the same-frame picture with a user facial image in the second video.

* * * * *